United States Patent
Akkarakaran et al.

(10) Patent No.: US 11,139,935 B2
(45) Date of Patent: Oct. 5, 2021

(54) APERIODIC AND CROSS COMPONENT CARRIER POSITIONING REFERENCE SIGNALS

(71) Applicant: QUALCOMM Incorporated, San Diego, CA (US)

(72) Inventors: Sony Akkarakaran, Poway, CA (US); Alexandros Manolakos, San Diego, CA (US); Tao Luo, San Diego, CA (US); Joseph Binamira Soriaga, San Diego, CA (US); Sven Fischer, Nuremberg (DE); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/861,018

(22) Filed: Apr. 28, 2020

(65) Prior Publication Data

US 2020/0351047 A1    Nov. 5, 2020

Related U.S. Application Data

(60) Provisional application No. 62/842,484, filed on May 2, 2019.

(51) Int. Cl.
*H04W 4/00* (2018.01)
*H04L 5/00* (2006.01)
(Continued)

(52) U.S. Cl.
CPC ........ *H04L 5/0048* (2013.01); *H04L 61/6022* (2013.01); *H04W 24/10* (2013.01);
(Continued)

(58) Field of Classification Search
CPC ......... H04L 15/0048; H04L 151/6022; H04W 24/10
See application file for complete search history.

(56) References Cited

U.S. PATENT DOCUMENTS 9,491,575 B2    11/2016    Edge et al.
9,769,621 B2     9/2017    Xiao et al.
(Continued)

FOREIGN PATENT DOCUMENTS

EP    2860903 A1    4/2015
EP    3177088 A1    6/2017
(Continued)

OTHER PUBLICATIONS

Partial International Search Report—PCT/US2020/030406—ISA/EPO—dated Jul. 21, 2020.
(Continued)

*Primary Examiner* — Elisabeth Benoit Magloire
(74) *Attorney, Agent, or Firm* — Qualcomm Incorporated

(57) ABSTRACT

Methods, systems, and devices for wireless communications are described. The described techniques relate to improved methods, systems, devices, and apparatuses that support aperiodic and cross component carrier positioning reference signals (PRSs). Generally, the described techniques provide for receiving a dynamic trigger indicating that a user equipment (UE) is to monitor for one or more downlink PRSs. The UE may generate a timing measurement for the downlink PRSs, and may transmit a measurement report that indicates the timing measurement to a transmission/reception point. A UE may also transmit a capability indicator, indicating that the UE is capable of maintaining phase coherence for a PRS that spans multiple component carriers, receive control signaling that indicates multiple component carries on which the PRS is phase coherent, generate a timing measurement for the PRS based on the control
(Continued)

signaling, and transmit a measurement report that indicates the timing measurement to the transmission/reception point.

17 Claims, 21 Drawing Sheets

(51) Int. Cl.
    *H04W 24/10*    (2009.01)
    *H04L 29/12*    (2006.01)
    *H04W 72/04*    (2009.01)
    *H04W 64/00*    (2009.01)

(52) U.S. Cl.
    CPC ....... *H04W 64/003* (2013.01); *H04W 72/042* (2013.01); *H04W 72/0446* (2013.01)

(56) References Cited

U.S. PATENT DOCUMENTS

| | | |
|---|---|---|
| 10,111,213 B2 | 10/2018 | Lee et al. |
| 10,469,226 B2 | 11/2019 | Kim et al. |
| 2014/0328327 A1* | 11/2014 | Xiao ................. H04W 36/30 370/332 |
| 2017/0171857 A1* | 6/2017 | Lee ................... H04W 64/00 |
| 2017/0339658 A1 | 11/2017 | Wang et al. |
| 2018/0048444 A1 | 2/2018 | Park et al. |
| 2018/0317111 A1* | 11/2018 | Agnihotri ............ G01S 5/0027 |
| 2019/0215121 A1* | 7/2019 | Lin ..................... H04L 5/0007 |
| 2019/0230618 A1* | 7/2019 | Saur .................... G01S 5/0236 |
| 2019/0364570 A1* | 11/2019 | Kumar ................ H04B 17/336 |
| 2019/0380056 A1* | 12/2019 | Lee ..................... H04L 43/0882 |
| 2020/0107209 A1* | 4/2020 | Ratasuk .............. H04L 41/0806 |

FOREIGN PATENT DOCUMENTS

| | | |
|---|---|---|
| WO | WO-2014163554 A1 | 10/2014 |
| WO | WO-2016122757 A1 | 8/2016 |
| WO | WO-2016122812 A1 | 8/2016 |
| WO | WO-2018102587 A1 | 6/2018 |

OTHER PUBLICATIONS

International Search Report and Written Opinion—PCT/US2020/030406—ISA/EPO—Oct. 12, 2020.

* cited by examiner

APERIODIC AND CROSS COMPONENT CARRIER POSITIONING REFERENCE SIGNALS

CROSS REFERENCE

The present application for patent claims the benefit of U.S. Provisional Patent Application No. 62/842,484 by AKKARAKARAN, et al., entitled "APERIODIC AND CROSS COMPONENT CARRIER POSITIONING REFERENCE SIGNALS," filed May 2, 2019, assigned to the assignee hereof, and expressly incorporated by reference herein.

FIELD OF TECHNOLOGY

The following relates generally to wireless communications, and more specifically to aperiodic and cross component carrier positioning reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some examples of a wireless communications system (e.g., an NR system) may support positioning procedures to identify the location of a UE. However, conventional positioning procedures, particularly in cases of aperiodic and semi-persistent positioning reference signal (PRS), may be inefficient.

SUMMARY

The described techniques relate to improved methods, systems, devices, and apparatuses that support aperiodic and cross component carrier positioning reference signals. Generally, the described techniques provide for receiving, at a user equipment (UE), a dynamic trigger indicating that the UE is to monitor for one or more downlink positioning reference signals (PRSs). The UE may generate a timing measurement for the one or more downlink PRSs based at least in part on receiving the dynamic trigger, and may transmit a measurement report that indicates the timing measurement to a serving base station.

The described techniques may also provide for cross component carrier stitching. Generally, the described techniques provide for transmitting, from a UE to a base station, a capability indicator that indicates that the UE is capable of maintaining phase coherence for a PRS that spans multiple component carriers. The UE may receive, from the base station, control signaling that indicates multiple component carries on which the PRS is phase coherent based at least in part on the capability indicator. The UE may generate a timing measurement for the PRS that spans the multiple component carriers based on the control signaling, and may the transmit a measurement report that indicates the timing measurement to the base station.

A method of wireless communications by a UE is described. The method may include receiving a dynamic trigger that indicates that the UE is to monitor for a downlink PRS from a transmission/reception point, generating a timing measurement for the downlink PRS based on the dynamic trigger, and transmitting a measurement report that indicates the timing measurement.

An apparatus for wireless communications by a UE is described. The apparatus may include a processor, memory in electronic communication with the processor, and instructions stored in the memory. The instructions may be executable by the processor to cause the apparatus to receive a dynamic trigger that indicates that the UE is to monitor for a downlink PRS from a transmission/reception point, generate a timing measurement for the downlink PRS based on the dynamic trigger, and transmit a measurement report that indicates the timing measurement.

Another apparatus for wireless communications by a UE is described. The apparatus may include means for receiving a dynamic trigger that indicates that the UE is to monitor for a downlink PRS from a transmission/reception point, generating a timing measurement for the downlink PRS based on the dynamic trigger, and transmitting a measurement report that indicates the timing measurement.

A non-transitory computer-readable medium storing code for wireless communications by a UE is described. The code may include instructions executable by a processor to receive a dynamic trigger that indicates that the UE is to monitor for a downlink PRS from a transmission/reception point, generate a timing measurement for the downlink PRS based on the dynamic trigger, and transmit a measurement report that indicates the timing measurement.

In some examples of the method, apparatuses, and non-transitory computer-readable medium described herein, receiving the dynamic trigger may include operations, features, means, or instructions for receiving a medium access control (MAC) control element (CE), downlink control information, or both, that indicates that the UE may be to monitor for the downlink PRS.

In some examples of the method, apparatuses, and non-transitory computer-readable medium described herein, receiving the dynamic trigger may include operations, features, means, or instructions for receiving the dynamic trigger that indicates to monitor for a respective downlink PRS from each base station of a set of base stations.

In some examples of the method, apparatuses, and non-transitory computer-readable medium described herein, generating the timing measurement may include operations, features, means, or instructions for generating a respective timing measurement for the respective downlink PRSs, where the measurement report indicates at least one of the respective timing measurements.

In some examples of the method, apparatuses, and non-transitory computer-readable medium described herein, receiving the dynamic trigger may include operations, features, means, or instructions for receiving the dynamic trigger that indicates a PRS occasion to monitor for the downlink PRS.

In some examples of the method, apparatuses, and non-transitory computer-readable medium described herein, receiving the dynamic trigger may include operations, features, means, or instructions for receiving the dynamic trigger that indicates that a duration of the PRS occasion may be at least one transmission time interval.

In some examples of the method, apparatuses, and non-transitory computer-readable medium described herein, each transmission time interval of the at least one transmission time interval may be a symbol period, a mini-slot, or a slot.

In some examples of the method, apparatuses, and non-transitory computer-readable medium described herein, receiving the dynamic trigger may include operations, features, means, or instructions for receiving the dynamic trigger that indicates a defined number of PRS occasions to monitor for the downlink PRS.

Some examples of the method, apparatuses, and non-transitory computer-readable medium described herein may further include operations, features, means, or instructions for de-activating monitoring for the downlink PRS subsequent to a last PRS occasion of the defined number of PRS occasions.

Some examples of the method, apparatuses, and non-transitory computer-readable medium described herein may further include operations, features, means, or instructions for transmitting a trigger request to the base station, where the dynamic trigger may be received based on the trigger request.

In some examples of the method, apparatuses, and non-transitory computer-readable medium described herein, receiving the dynamic trigger may include operations, features, means, or instructions for receiving the dynamic trigger that indicates a muting pattern, and determining to monitor for the downlink positioning reference signal during a downlink PRS occasion based on the muting pattern.

Some examples of the method, apparatuses, and non-transitory computer-readable medium described herein may further include operations, features, means, or instructions for receiving the dynamic trigger that indicates a muting pattern, and determining to skip monitoring for the downlink PRS during a downlink PRS occasion based on the muting pattern.

A method of wireless communications by a base station is described. The method may include transmitting a dynamic trigger that indicates that a UE is to monitor for a downlink PRS from a transmission/reception point and receiving a measurement report that indicates a timing measurement for the downlink PRS.

An apparatus for wireless communications by a base station is described. The apparatus may include a processor, memory in electronic communication with the processor, and instructions stored in the memory. The instructions may be executable by the processor to cause the apparatus to transmit a dynamic trigger that indicates that a UE is to monitor for a downlink PRS from a transmission/reception point and receive a measurement report that indicates a timing measurement for the downlink PRS.

Another apparatus for wireless communications by a base station is described. The apparatus may include means for transmitting a dynamic trigger that indicates that a UE is to monitor for a downlink PRS from a transmission/reception point and receiving a measurement report that indicates a timing measurement for the downlink PRS.

A non-transitory computer-readable medium storing code for wireless communications by a base station is described. The code may include instructions executable by a processor to transmit a dynamic trigger that indicates that a UE is to monitor for a downlink PRS from a transmission/reception point and receive a measurement report that indicates a timing measurement for the downlink PRS.

In some examples of the method, apparatuses, and non-transitory computer-readable medium described herein, transmitting the dynamic trigger may include operations, features, means, or instructions for transmitting a medium access control MAC-CE, downlink control information, or both, that indicates that the UE may be to monitor for the downlink PRS.

Some examples of the method, apparatuses, and non-transitory computer-readable medium described herein may further include operations, features, means, or instructions for transmitting a downlink PRS configuration to a second base station to coordinate transmission of the downlink PRS with transmission of a second downlink PRS by the second base station.

In some examples of the method, apparatuses, and non-transitory computer-readable medium described herein, the downlink PRS configuration indicates a set of PRS occasions.

In some examples of the method, apparatuses, and non-transitory computer-readable medium described herein, transmitting the dynamic trigger may include operations, features, means, or instructions for transmitting the dynamic trigger that indicates to monitor for a respective downlink PRS from each base station of a set of base stations.

In some examples of the method, apparatuses, and non-transitory computer-readable medium described herein, the measurement report indicates a respective timing measurement for the respective downlink PRSs.

In some examples of the method, apparatuses, and non-transitory computer-readable medium described herein, transmitting the dynamic trigger may include operations, features, means, or instructions for transmitting the dynamic trigger that indicates a PRS occasion to monitor for the downlink PRS.

In some examples of the method, apparatuses, and non-transitory computer-readable medium described herein, transmitting the dynamic trigger may include operations, features, means, or instructions for transmitting the dynamic trigger that indicates that a duration of the PRS occasion may be at least one transmission time interval.

In some examples of the method, apparatuses, and non-transitory computer-readable medium described herein, each transmission time interval of the at least one transmission time interval may be a symbol period, a mini-slot, or a slot.

In some examples of the method, apparatuses, and non-transitory computer-readable medium described herein, transmitting the dynamic trigger may include operations, features, means, or instructions for transmitting the dynamic trigger that indicates a defined number of PRS occasions to monitor for the downlink PRS.

Some examples of the method, apparatuses, and non-transitory computer-readable medium described herein may further include operations, features, means, or instructions for receiving a trigger request from the UE, where the dynamic trigger may be transmitted based on the trigger request.

In some examples of the method, apparatuses, and non-transitory computer-readable medium described herein, transmitting the dynamic trigger may include operations, features, means, or instructions for transmitting the dynamic trigger that indicates a muting pattern.

Some examples of the method, apparatuses, and non-transitory computer-readable medium described herein may further include operations, features, means, or instructions for transmitting the measurement report to a positioning server.

Some examples of the method, apparatuses, and non-transitory computer-readable medium described herein may further include operations, features, means, or instructions for determining a location estimate for the UE based on the measurement report.

A method of wireless communications by a UE is described. The method may include transmitting a capability indicator that indicates the UE is capable of maintaining phase coherence for a PRS that spans multiple component carriers, receiving control signaling indicating a set of component carriers on which the PRS is phase coherent based on the capability indicator, generating a timing measurement for the PRS that spans the set of component carriers based on the control signaling, and transmitting a measurement report that indicates the timing measurement.

An apparatus for wireless communications by a UE is described. The apparatus may include a processor, memory in electronic communication with the processor, and instructions stored in the memory. The instructions may be executable by the processor to cause the apparatus to transmit a capability indicator that indicates the UE is capable of maintaining phase coherence for a PRS that spans multiple component carriers, receive control signaling indicating a set of component carriers on which the PRS is phase coherent based on the capability indicator, generate a timing measurement for the PRS that spans the set of component carriers based on the control signaling, and transmit a measurement report that indicates the timing measurement.

Another apparatus for wireless communications by a UE is described. The apparatus may include means for transmitting a capability indicator that indicates the UE is capable of maintaining phase coherence for a PRS that spans multiple component carriers, receiving control signaling indicating a set of component carriers on which the PRS is phase coherent based on the capability indicator, generating a timing measurement for the PRS that spans the set of component carriers based on the control signaling, and transmitting a measurement report that indicates the timing measurement.

A non-transitory computer-readable medium storing code for wireless communications by a UE is described. The code may include instructions executable by a processor to transmit a capability indicator that indicates the UE is capable of maintaining phase coherence for a PRS that spans multiple component carriers, receive control signaling indicating a set of component carriers on which the PRS is phase coherent based on the capability indicator, generate a timing measurement for the PRS that spans the set of component carriers based on the control signaling, and transmit a measurement report that indicates the timing measurement.

In some examples of the method, apparatuses, and non-transitory computer-readable medium described herein, transmitting the capability indicator may include operations, features, means, or instructions for transmitting the capability indicator that indicates an event under which the UE may be capable of maintaining phase coherence for the PRS that spans multiple component carriers.

In some examples of the method, apparatuses, and non-transitory computer-readable medium described herein, the event may be a bandwidth retuning event, a downlink to uplink transition event, an uplink to downlink transition event, a change in transmission power event, a change in assigned resource block event, or any combination thereof.

In some examples of the method, apparatuses, and non-transitory computer-readable medium described herein, transmitting the capability indicator may include operations, features, means, or instructions for transmitting the capability indicator that indicates an event under which the UE may be not capable of maintaining phase coherence for the PRS that spans multiple component carriers.

In some examples of the method, apparatuses, and non-transitory computer-readable medium described herein, transmitting the capability indicator may include operations, features, means, or instructions for transmitting the capability indicator that indicates a partial coherent processing capability.

Some examples of the method, apparatuses, and non-transitory computer-readable medium described herein may further include operations, features, means, or instructions for identifying at least a partial coherence loss for the PRS within at least one component carrier of the set of component carriers, estimating a phase offset for the PRS within the at least one component carrier, and correcting for the partial coherence loss based on the phase offset, where the timing measurement for the PRS that spans the set of component carriers may be generated based on the correcting.

In some examples of the method, apparatuses, and non-transitory computer-readable medium described herein, the capability indicator indicates one or more of a band specific capability, a transmission capability, a reception capability, or any combination thereof.

Some examples of the method, apparatuses, and non-transitory computer-readable medium described herein may further include operations, features, means, or instructions for identifying that a guard band may be reduced or removed for the PRS that spans the set of component carriers on a same transmission time interval with intra-band carrier aggregation.

In some examples of the method, apparatuses, and non-transitory computer-readable medium described herein, the identifying may include operations, features, means, or instructions for receiving configuration signaling or a guard band indicator indicating that the guard band may be reduced or removed.

A method of wireless communications by a base station is described. The method may include receiving a capability indicator that indicates a UE is capable of maintaining phase coherence for a PRS that spans multiple component carriers, transmitting control signaling indicating a set of component carriers on which the PRS is phase coherent based on the capability indicator, transmitting the PRS that spans the set of component carriers based on the control signaling, and receiving a measurement report that indicates a timing measurement for the PRS that spans the set of component carriers.

An apparatus for wireless communications by a base station is described. The apparatus may include a processor, memory in electronic communication with the processor, and instructions stored in the memory. The instructions may be executable by the processor to cause the apparatus to receive a capability indicator that indicates a UE is capable of maintaining phase coherence for a PRS that spans multiple component carriers, transmit control signaling indicating a set of component carriers on which the PRS is phase coherent based on the capability indicator, transmit the PRS that spans the set of component carriers based on the control signaling, and receive a measurement report that indicates a timing measurement for the PRS that spans the set of component carriers.

Another apparatus for wireless communications by a base station is described. The apparatus may include means for receiving a capability indicator that indicates a UE is capable of maintaining phase coherence for a PRS that spans multiple component carriers, transmitting control signaling indicating a set of component carriers on which the PRS is phase coherent based on the capability indicator, transmitting the PRS that spans the set of component carriers based on the control signaling, and receiving a measurement report that indicates a timing measurement for the PRS that spans the set of component carriers.

A non-transitory computer-readable medium storing code for wireless communications by a base station is described. The code may include instructions executable by a processor to receive a capability indicator that indicates a UE is capable of maintaining phase coherence for a PRS that spans multiple component carriers, transmit control signaling indicating a set of component carriers on which the PRS is phase coherent based on the capability indicator, transmit the PRS that spans the set of component carriers based on the control signaling, and receive a measurement report that indicates a timing measurement for the PRS that spans the set of component carriers.

In some examples of the method, apparatuses, and non-transitory computer-readable medium described herein, receiving the capability indicator may include operations, features, means, or instructions for receiving the capability indicator that indicates an event under which the UE may be capable of maintaining phase coherence for the PRS that spans multiple component carriers.

In some examples of the method, apparatuses, and non-transitory computer-readable medium described herein, the event may be a bandwidth retuning event, a downlink to uplink transition event, an uplink to downlink transition event, a change in transmission power event, a change in assigned resource block event, or any combination thereof.

In some examples of the method, apparatuses, and non-transitory computer-readable medium described herein, receiving the capability indicator may include operations, features, means, or instructions for receiving the capability indicator that indicates an event under which the UE may be not capable of maintaining phase coherence for the PRS that spans multiple component carriers.

In some examples of the method, apparatuses, and non-transitory computer-readable medium described herein, receiving the capability indicator may include operations, features, means, or instructions for receiving the capability indicator that indicates a partial coherent processing capability.

In some examples of the method, apparatuses, and non-transitory computer-readable medium described herein, the capability indicator indicates one or more of a band specific capability, a transmission capability, a reception capability, or any combination thereof.

Some examples of the method, apparatuses, and non-transitory computer-readable medium described herein may further include operations, features, means, or instructions for transmitting configuration signaling or a guard band indicator indicating that a guard band may be reduced or removed for the PRS that spans the set of component carriers on a same transmission time interval with intra-band carrier aggregation.

A method of wireless communications by a UE is described. The method may include transmitting a capability indicator that indicates the UE is capable of maintaining phase coherence for a PRS that spans multiple component carriers, receiving control signaling indicating a set of component carriers on which the PRS is phase coherent based on the capability indicator, and transmitting the PRS that spans the set of component carriers based on the control signaling.

An apparatus for wireless communications by a UE is described. The apparatus may include a processor, memory in electronic communication with the processor, and instructions stored in the memory. The instructions may be executable by the processor to cause the apparatus to transmit a capability indicator that indicates the UE is capable of maintaining phase coherence for a PRS that spans multiple component carriers, receive control signaling indicating a set of component carriers on which the positioning reference signal is phase coherent based on the capability indicator, and transmit the PRS that spans the set of component carriers based on the control signaling.

Another apparatus for wireless communications by a UE is described. The apparatus may include means for transmitting a capability indicator that indicates the UE is capable of maintaining phase coherence for a PRS that spans multiple component carriers, receiving control signaling indicating a set of component carriers on which the PRS is phase coherent based on the capability indicator, and transmitting the PRS that spans the set of component carriers based on the control signaling.

A non-transitory computer-readable medium storing code for wireless communications by a UE is described. The code may include instructions executable by a processor to transmit a capability indicator that indicates the UE is capable of maintaining phase coherence for a PRS that spans multiple component carriers, receive control signaling indicating a set of component carriers on which the PRS is phase coherent based on the capability indicator, and transmit the PRS that spans the set of component carriers based on the control signaling.

Some examples of the method, apparatuses, and non-transitory computer-readable medium described herein may further include operations, features, means, or instructions for receiving configuration signaling indicating to use an inter component carrier guard band for transmitting the PRS, where the PRS that spans the set of component carriers may be transmitted within the guard band.

A method of wireless communications by a base station is described. The method may include receiving a capability indicator that indicates a UE is capable of maintaining phase coherence for a PRS that spans multiple component carriers, transmitting control signaling indicating a set of component carriers on which the PRS by the UE is to be phase coherent based on the capability indicator, and generating a timing measurement for the PRS that spans the set of component carriers based on the control signaling.

An apparatus for wireless communications by a base station is described. The apparatus may include a processor, memory in electronic communication with the processor, and instructions stored in the memory. The instructions may be executable by the processor to cause the apparatus to receive a capability indicator that indicates a UE is capable of maintaining phase coherence for a PRS that spans multiple component carriers, transmit control signaling indicating a set of component carriers on which the PRS by the UE is to be phase coherent based on the capability indicator, and generate a timing measurement for the PRS that spans the set of component carriers based on the control signaling.

Another apparatus for wireless communications by a base station is described. The apparatus may include means for receiving a capability indicator that indicates a UE is capable of maintaining phase coherence for a PRS that spans multiple component carriers, transmitting control signaling indicating a set of component carriers on which the PRS by the UE is to be phase coherent based on the capability indicator, and generating a timing measurement for the PRS that spans the set of component carriers based on the control signaling.

A non-transitory computer-readable medium storing code for wireless communications by a base station is described. The code may include instructions executable by a processor to receive a capability indicator that indicates a UE is capable of maintaining phase coherence for a PRS that spans multiple component carriers, transmit control signaling indicating a set of component carriers on which the PRS by the UE is to be phase coherent based on the capability indicator, and generate a timing measurement for the PRS that spans the set of component carriers based on the control signaling.

Some examples of the method, apparatuses, and non-transitory computer-readable medium described herein may further include operations, features, means, or instructions for transmitting configuration signaling indicating that the UE may be to use an inter component carrier guard band for transmitting the PRS.

Some examples of the method, apparatuses, and non-transitory computer-readable medium described herein may further include operations, features, means, or instructions for transmitting a measurement report that indicates the timing measurement to a positioning server.

Some examples of the method, apparatuses, and non-transitory computer-readable medium described herein may further include operations, features, means, or instructions for determining a location estimate for the UE based on the timing measurement.

DETAILED DESCRIPTION

Figure 1:
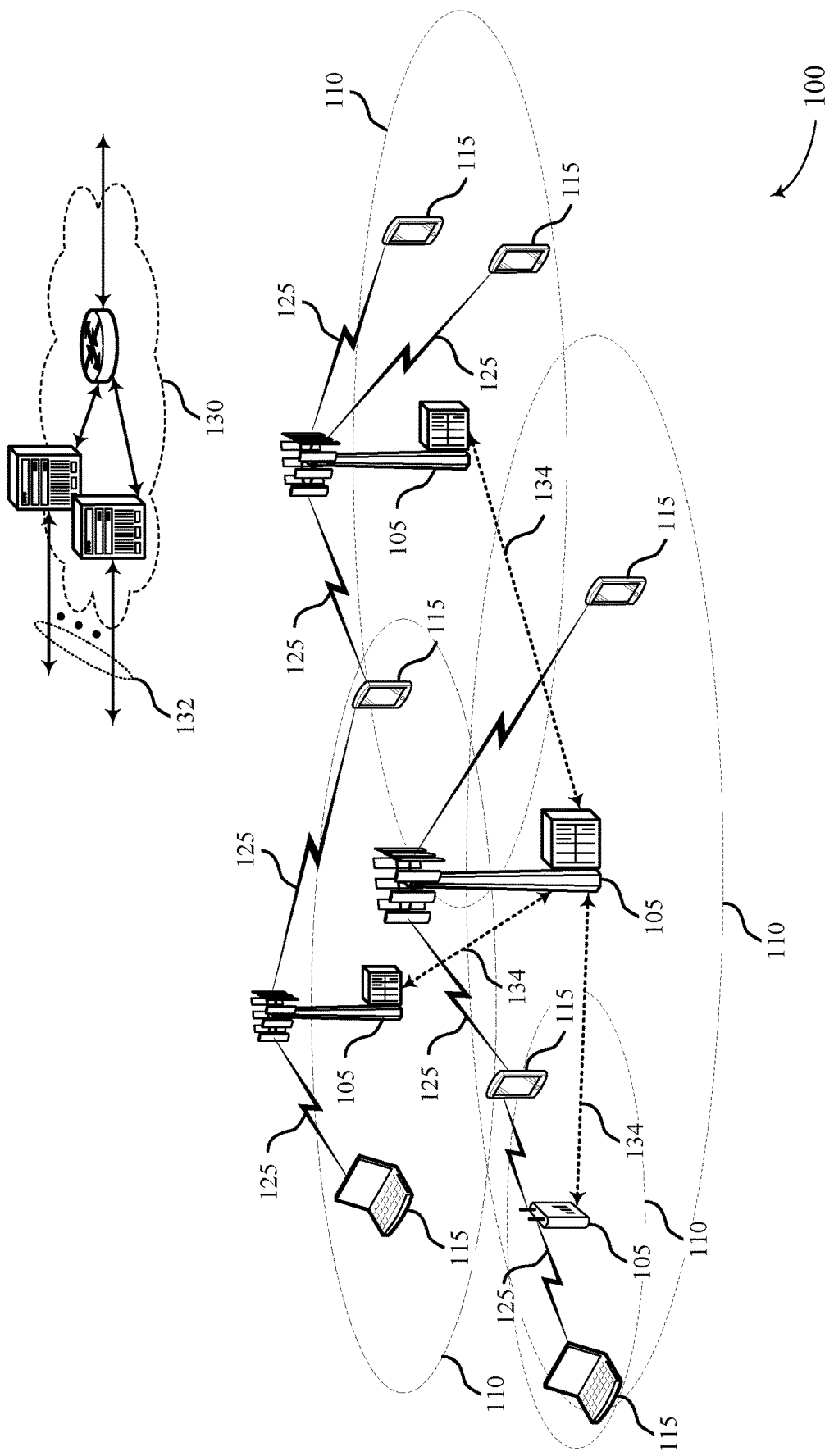
FIG. 1 illustrates an example of a system for wireless communications that supports aperiodic and cross component carrier positioning reference signals (PRSs) in accordance with aspects of the present disclosure.

In some examples of a wireless communications system (e.g., an NR system), a positioning server (e.g., a location management function (LMF)) may manage or oversee some positioning procedures. For instance, a user equipment (UE) or another entity may request positioning information for a UE, or the LMF may determine that positioning information for the UE should be determined. One or more base stations may send positioning reference signals (PRSs) to a UE. The UE may perform measurements on the PRSs received from multiple base stations, and may determine timing information for the PRSs. The UE may report the timing information to the LMF (e.g., directly or via one or more base stations), and the LMF may determine a location for the UE based thereon. However, some implementations of positioning procedures may be inefficient, slow, or both.

In some conventional approaches to positioning procedures, an LMF may coordinate with one or more base stations to initiate a positioning procedure. The one or more base stations may configure the UE with uplink PRS occasions on which to transmit uplink PRSs (e.g., via radio resource control (RRC) signaling, LTE positioning protocol (LPP) signaling, or the like), and the one or more base stations may generate timing measurements of uplink PRS transmissions by the UE. Having the LMF coordinate with one or more base stations to initiate a UE positioning procedure may result in increased system latency. Further, continuous monitoring of PRS occasions based on higher layer signaling may be inefficient for aperiodic PRSs or semi-persistent PRSs, resulting in increased system latency, and decreased system efficiency.

In some examples as described herein, a base station may coordinate with other base stations to identify downlink PRS occasions, and may dynamically trigger downlink PRS monitoring at a UE. For example, in response to a request from the UE or configuration information from the LMF, a serving base station may transmit a dynamic trigger to the UE. The dynamic trigger may indicate that the UE should monitor for the downlink PRSs from the base station, and may further indicate a number of PRS occasions on which to monitor. The UE may receive downlink PRSs according to the dynamic indication, and may generate a timing measurement for downlink PRSs. The UE may transmit a measurement report that indicates the timing measurement to the base station. The base station may estimate a location of the UE based on the measurement report, or the base station may provide the measurement report to the LMF for estimating UE location.

In some examples, positioning accuracy may be improved PRSs are sent on the uplink or downlink over larger bandwidths. This may be accomplished by sending a PRS that spans multiple component carriers. However, some operations at the UE (e.g., radio frequency chain switching, retuning bandwidths, downlink uplink transition, changes in transmit power, or the like) may result in phase incoherence across multiple component carriers.

To determine whether a UE is capable of addressing or correcting the loss of phase coherence across component carriers, the UE may report capability information to a serving base station. The serving base station may provide coherence information to the UE indicating downlink PRSs over which component carriers may be assumed to be phase coherent, or over which uplink PRSs the UE is to provide phase coherence (e.g., transmit using a same antenna port). For example, a UE may send a capability indicator to the base station, which may indicate whether the UE capable of maintaining phase coherence for PRSs that span multiple component carriers. The base station may transmit to the UE control signaling indicating which downlink signals across component carriers can be assumed to be phase coherent. The base station may then send a downlink PRS that spans multiple component carriers. The UE may receive the PRSs, and may generate a timing measurement for the PRS. In some examples, the UE may generate the timing measurement by using its indicated capability to correct a loss of coherence across component carriers. Having generated the timing measurement, the UE may transmit a measurement report indicating the timing measurements to the base station. On the uplink, the base station may transmit to the UE control signaling indicating which downlink signals across component carriers are to be phase coherent, and the UE may transmit an uplink PRS that spans multiple component carriers in a phase coherent manner. The base station may generate a timing measurement using the received uplink PRS for estimating a geographic location of the UE.

Aspects of the disclosure are initially described in the context of a wireless communications system. Aspects of the disclosure are further illustrated by and described with reference to timelines and process flows. Aspects of the disclosure are further illustrated by and described with reference to apparatus diagrams, system diagrams, and flowcharts that relate to aperiodic and cross component carrier PRSs.

FIG. 1 illustrates an example of a wireless communications system 100 that supports aperiodic and cross component carrier PRSs in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and a base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or have different capabilities. Some example UEs 115 are illustrated in FIG. 1. The UEs 115 described herein may be able to communicate with various types of devices, such as other UEs 115 as well as base stations 105 and network equipment (e.g., core network nodes, relay devices, integrated access and backhaul nodes), as shown in FIG. 1.

Base stations 105 may communicate with the core network 130, or with one another, or both. For example, base stations 105 may interface with the core network 130 through backhaul links 132 (e.g., via an S1, N2, N3, or other interfaces). Base stations 105 may communicate with one another over backhaul links 132 (e.g., via an X2, Xn, or other interface) either directly (e.g., directly between base stations 105), or indirectly (e.g., via core network 130), or both. In some examples, backhaul links 132 may be or include one or more wireless links.

Base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

UEs 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with each other via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals or system information, etc.), control signaling that coordinates operation for the carrier, user data, or other signaling. Wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)), and may be positioned according to a channel raster for discovery by UEs. A carrier may be operated in a standalone mode where initial acquisition and connection may be conducted by UEs via the carrier, or in a non-standalone mode where a connection is anchored using a different carrier (e.g., of the same or a different radio access technology).

Communication links 125 shown in wireless communications system 100 may include uplink transmissions from a UE 115 to a transmission/reception point (TRP) (e.g., a base station 105), or downlink transmissions from a transmission/reception point (TRP) (e.g., base station 105) to a UE 115. Carriers may carry downlink or uplink communications (e.g., in an FDD mode), or be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into bandwidth parts having the same or different numerologies. In some examples, where a UE 115 may be configured with multiple bandwidth parts. In some cases, a single bandwidth part for a carrier is active at a given time, and communications for the UE 115 may be restricted to active bandwidth parts.

Time intervals for base stations 105 or UEs 115 may be expressed in multiples of a basic time unit, which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). The radio frames may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain $N_f$ sampling periods. The duration of the symbol periods may depend on the subcarrier spacing or frequency band of operation.

A subframe, a slot, a mini-slot, or a symbol may be the smallest scheduling unit of the wireless communications system 100, and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., control resource sets (CORESETs)) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs and UE-specific search space sets for sending control information to a specific UE.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverages areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may unrestricted access by UEs 115 with service subscriptions with the network provider or may provide restricted access by UEs 115 having an association with the small cell (e.g., UEs in a closed subscriber group (CSG), UEs 115 associated with users in a home or office, and the like). A base station 105 may support one or multiple cells, and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may, in some examples, not be aligned in time. The techniques described herein may be used for either synchronous or asynchronous operations.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving deep sleep mode when not engaging in active communications, or operating over a limited bandwidth (e.g., according to narrowband communications). For example, some UEs 115 may be configured for operation using a narrowband protocol type (e.g., NB-IoT) that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, wireless communications system 100 may be configured to support ultra-reliable low-latency communications (URLLC) or mission critical communications. UEs 115 may be designed to support ultra-reliable, low-latency, or critical functions (e.g., mission critical functions. Ultra-reliable communications may include private communication or group communication, and may be supported by one or more mission critical services such as mission critical push-to-talk (MCPTT), mission critical video (MCVideo), or mission critical data (MCData). Support for mission critical functions may include prioritization of services and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 125 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., mobility management entity (MME), access and mobility management function (AMF)), and at least one user plane entity that routes packets or interconnects to external networks (e.g., serving gateway (S-GW), Packet Data Network (PDN) gateway (P-GW), user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity may communicate with UEs 115 through a number of other access network transmission entities, which may be referred to as a radio head, a smart radio head, or a transmission/reception point (TRP). Each access network transmission entity may include one or more antenna panels. In some configurations, various functions of each access network entity or base station 105 may be distributed across various network devices (e.g., radio heads and ANCs) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. But the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

Base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115 Some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by a transmitting device such as a base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality.

In some cases, transmissions from a device (e.g., from a base station 105, from a UE 115) may be performed using multiple beam directions, and the base station may use a combination of digital precoding or radio frequency beamforming to generate a combined beam for transmission to the UE 115. The UE 115 may report feedback that indicates precoding weights for one or more beam directions, and the feedback may correspond to a configured number of beams across a system bandwidth or one or more sub-bands. The base station 105 may transmit reference signals (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at a plurality of antenna elements of an antenna array, or by processing received signals according to different receive beamforming weight sets applied to signals received at a plurality of antenna elements of an antenna array, any of which may be referred to as "listening" according to different receive configurations or receive directions. In some examples a receiving device may use a single receive configuration to receive along a single beam direction (e.g., when receiving a data signal). The single receive configuration may be aligned in a beam direction determined based at least in part on listening according to different receive configuration directions (e.g., a beam direction determined to have a highest signal strength, highest signal-to-noise ratio, or otherwise acceptable signal quality based at least in part on listening according to multiple beam directions).

Wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Generally, the described techniques provide for receiving, at a UE 115, a dynamic trigger indicating that the UE 115 is to monitor for one or more downlink positioning reference signals (PRSs). The UE 115 may generate a timing measurement for the one or more downlink PRSs based at least in part on receiving the dynamic trigger, and may transmit a measurement report that indicates the timing measurement to a serving base station 105.

The described techniques may also provide for cross component carrier stitching. Generally, the described techniques provide for transmitting, from a UE 115 to a base station 105, a capability indicator that indicates that the UE 115 is capable of maintaining phase coherence for a PRS that spans multiple component carriers. The UE 115 may receive, from the base station, control signaling that indicates multiple component carries on which the PRS is phase coherent based at least in part on the capability indicator. The UE 115 may generate a timing measurement for the PRS that spans the multiple component carriers based on the control signaling, and may then transmit a measurement report that indicates the timing measurement to the base station. In cases of uplink PRS, the UE 115 may transmit, based on the control signaling, a phase-coherent uplink PRS over multiple component carriers, and the base station 105 may take measurements based thereon.

In some examples, dynamic triggering of PRS signaling may result in increased system efficiency, and decreased power consumption. Decreased power consumption may allow for extended battery life for a UE 115. System latency may also be decreased, resulting in improved user experience.

Figure 2:
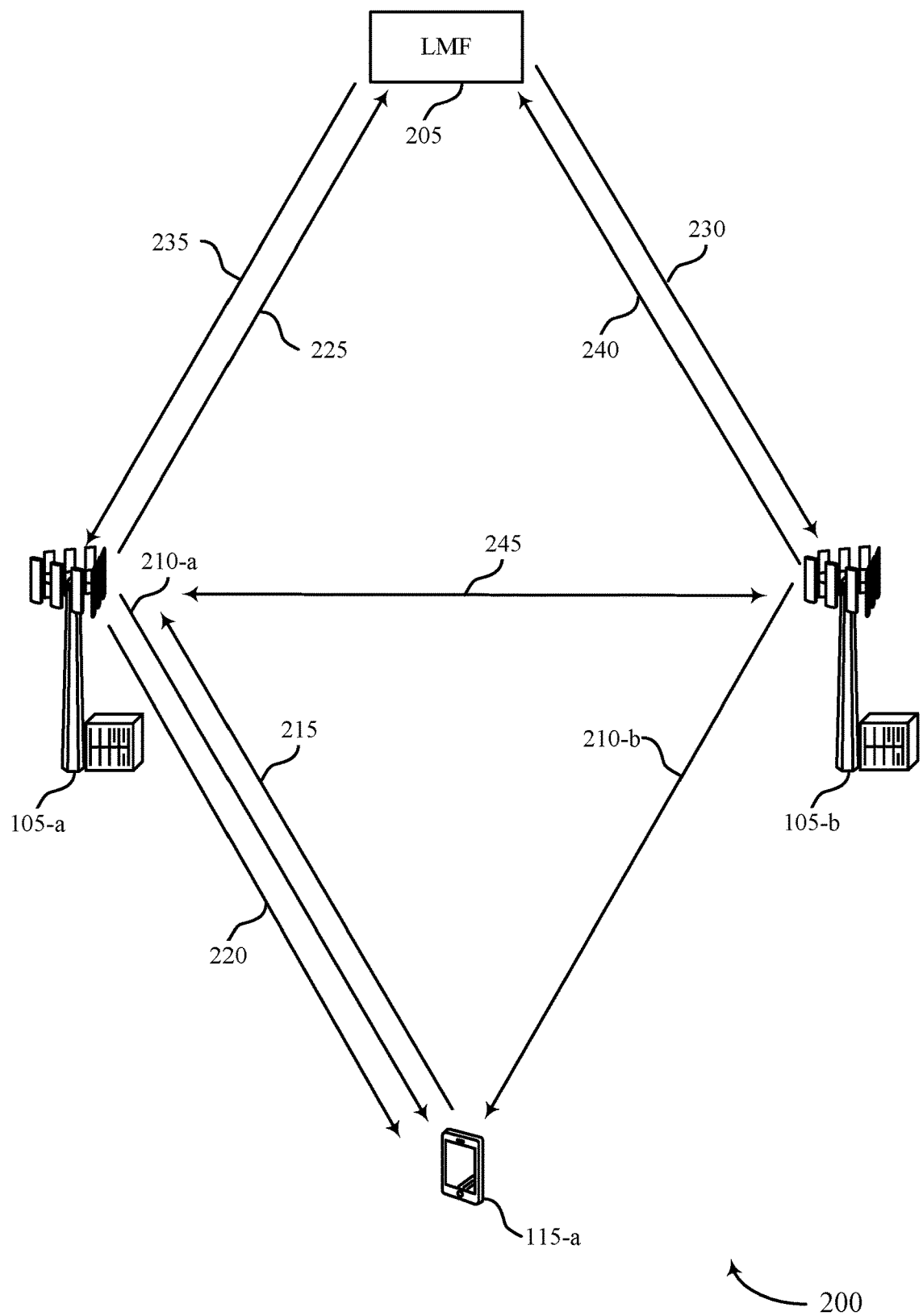
FIG. 2 illustrates an example of a wireless communications system that supports aperiodic and cross component carrier PRSs in accordance with aspects of the present disclosure.

FIG. 2 illustrates an example of a wireless communications system 200 that supports aperiodic and cross component carrier PRSs in accordance with aspects of the present disclosure. In some examples, wireless communications system 200 may implement aspects of wireless communications system 100.

Wireless communications system 200 may include a base station 105-a, a base station 105-b, a UE 115-a, and a positioning server (e.g., location management function (LMF) 205. LMF 205 may be housed with (e.g., co-located with) one of base station 105-a or base station 105-b, or may be at a different location than either of base station 105-a or base station 105-b. Base station 105-a may serve one or more UEs 115 (e.g., UE 115-a). LMF 205 may determine location information for a UE 115-a, based on positioning procedures. In some examples, positioning procedures may include one or more base stations 105 (e.g., base station 105-a and base station 105-b) sending one or more PRSs 210 to UE 115-a. UE 115-a may take measurements on the PRSs 210, and send a timing report 215 to LMF 205. LMF 205 may use the report to determine the location of UE 115-a.

In some examples, a UE 115-a, a base station 105-a, or LMF 205 may initiate PRS procedures. In any such examples, base station 105-a and base station 105-b may coordinate to identify resources over which to transmit PRS 210-a and PRS 210-b, respectively. In some examples, base station 105-a and base station 105-b may identify a set of PRS opportunities, and may send PRSs 210 over the identified resources, as described in greater detail with respect to FIGS. 3 and 4. If base station 105-a initiates PRS procedures, or if base station 105-a receives a request to initiate PRS procedures from UE 115-a, then base station 105-a may initiate coordination with base station 105-b to identify resources for PRS procedures. For instance, base station 105-a may send a configuration message 225 to LMF 205, and LMF 205 may relay configuration information 230 to base station 105-b.

Based on the received configuration information 230, base station 105-b may identify resources over which to transmit PRS 210-b. Base station 105-b may similarly coordinate with base station 105-a by sending a configuration message 240 (e.g., in response to receiving configuration information 230) to LMF 205, and LMF may relay configuration information 235 to base station 105-a. In some examples, base station 105-a may coordinate with base station 105-b via an Xn interface 245 (e.g., via a backhaul link). In some examples, LMF 205 may initiate the PRS procedures, and may also initiate coordination between base station 105-a and base station 105-b (e.g., may send configuration information 235 to base station 105-a and may send configuration information 230 to base station 105-b). In such examples, base station 105-a and base station 105-b may coordinate resources over which to transmit one or more PRSs 210-a and one or more PRSs 210-b.

Upon identifying resources for transmitting PRSs 210, base station 105-a may send a message indicating that UE 115-a may commence PRS monitoring. For instance, base station 105-a may transmit a PRS trigger 220 (e.g., a downlink control information (DCI), MAC-CE, or the like). PRS trigger 220 may include an indication of resources for monitoring for PRSs 210. The resources for monitoring may include a fixed number of one or more PRS occasions, as described in greater detail with respect to FIG. 3. In some examples, PRS trigger 220 may further indicate a muting pattern, which UE 115-a may apply to the identified PRS occasions, as described in greater detail with respect to FIG. 4.

UE 115-a may perform PRS monitoring based on the trigger 220. In some examples, upon receiving trigger 220, UE 115-a may identify one or more PRS occasions, and may monitor for one or more PRSs 210-a from base station 105-a and one or more PRSs 210-b from base station 105-b. In some examples, based on the fixed number of PRS occasions indicated in trigger 220, UE 115-a may not monitor for PRSs 210 or receive a deactivation message from base station 105-a. That is, if the PRS is aperiodic or semi-persistent then UE 115-a may avoid excessive power expenditure (e.g., may avoid monitoring for a deactivation message) and base station 105-a may avoid overhead costs (e.g., may not use additional resources for deactivation message signaling) by configuring a fixed number of PRS occasions, and indicating the fixed number of PRS occasions in trigger 220. Instead of monitoring PRS occasions indefinitely or until receiving a deactivation message, UE 115-a may monitor the indicated number of PRS occasions, and then may stop monitoring for PRSs 210. UE 115-a may perform PRS measurements on the received PRSs 210, and may generate a timing report 215 to send to base station 105-a. Base station 105-a may provide the timing information from timing report 215 to LMF 205, and LMF 205 may determine the location of UE 115-a based thereon.

In some examples, a UE 115-a may also support cross component carrier channel-stitching. For example, UE 115-a may report performance capabilities to base station 105-a, and base station 105-a may indicate to UE 115-a which downlink signals (of a set of multiple downlink signals) can be assumed to be phase coherent. UE 115-a may then receive one or more PRSs 210, perform measurements, and send a timing report 215 based thereon, as described in greater detail with respect to FIG. 6.

Figure 3:
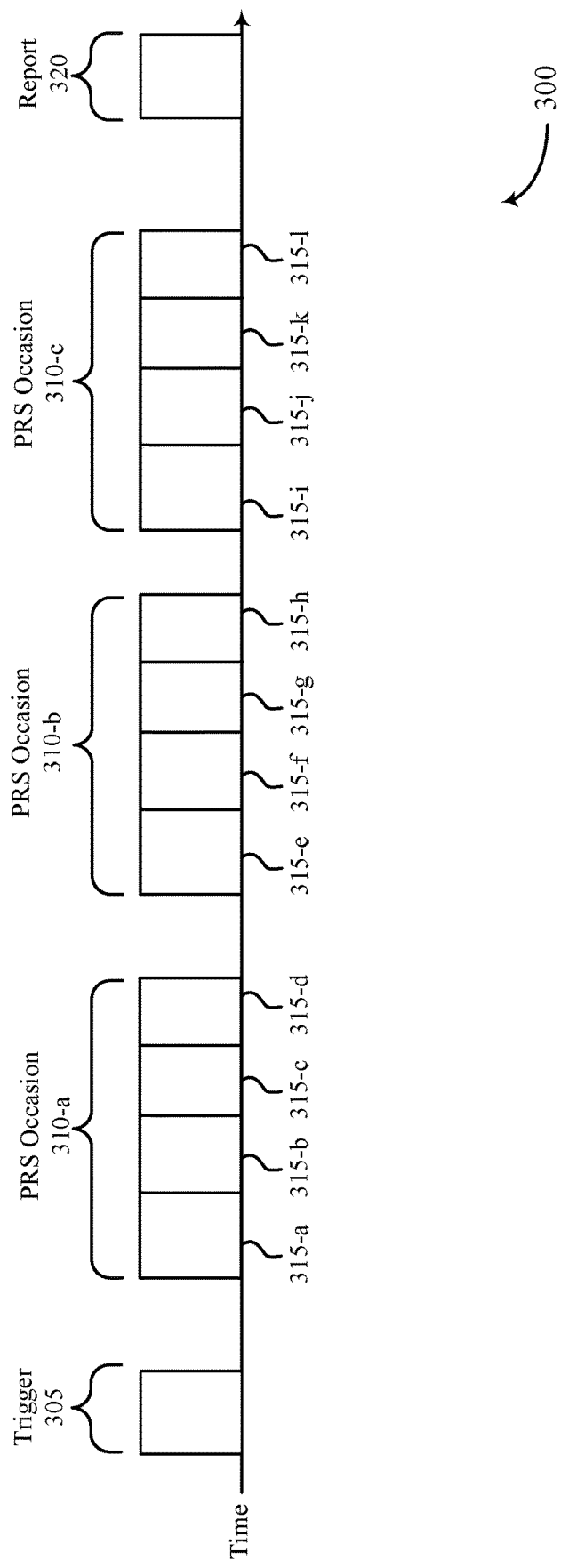
FIG. 3 illustrates an example of a timeline that supports aperiodic and cross component carrier PRSs in accordance with aspects of the present disclosure.

FIG. 3 illustrates an example of a timeline 300 that supports aperiodic and cross component carrier PRSs in accordance with aspects of the present disclosure. In some examples, timeline 300 may implement aspects of wireless communications system 100 or wireless communications system 200.

Some examples of PRS signaling may be inefficient, may result in increased overhead expenditures at base stations 105, excessive power consumption at a UE 115, and reduced flexibility. For example, an LMF 205 may configure a UE 115 with resources for uplink and/or downlink PRS signaling. The LMF 205 may configure the UE with downlink resources via higher layer signaling (e.g., RRC signaling). Higher layer configuring for downlink PRS may increase system latency, and may not be sufficiently flexible for efficient aperiodic or semi-persistent downlink PRS.

In some examples, in some methods for PRS signaling, an LMF 205 may communicate with one or more base stations 105 and UEs 115 to configure resources for PRSs. Upon receiving a request from a UE 115, a message from an external entity (e.g., an emergency response center responding to an emergency message from UE 115-a), or the like, an LMF 205 may provide UE 115 with PRS configuration information (e.g., via RRC signaling, LPP signaling, a combination thereof, or the like). For semi-persistent or aperiodic downlink PRS, PRS procedures may be activated by a MAC-CE or DCI, and may be deactivated by another MAC-CE or DCI. For instance, a one-shot trigger may be included in a DCI to activate PRS monitoring by a UE 115 (e.g., using resources previously configured via RRC signaling).

In some examples, a base station 105 may trigger its own PRS (e.g., if a UE 115 sends a request for downlink PRSs directly to the base station 105, instead of to an LMF 205). However, non-serving base stations 105 may take a greater amount of time to be informed (e.g., via LMF 205, via an Xn interface, or the like) to trigger their respective PRSs. Further, in the conventional method provided above, the same process may be repeated for de-activation (e.g., for semi-persistent PRS). In some cases, system latency may be improved by using more dynamic signaling.

As described with respect to FIG. 2, a serving base station 105, and one or more non-serving base stations 105, may coordinate with each other to identify resources over which to transmit PRSs. In some examples, the coordinating base stations 105 may identify a fixed number of PRS occasions 310, indicate the fixed number of PRS occasions to the UE 115 in a trigger 305, and may transmit PRSs during the PRS occasions 310.

One or more base stations may perform on-demand downlink PRS signaling by using a trigger 305. For instance, a serving base station 105 may reduce system latency by initiating PRS monitoring at a UE 115 via a dynamic trigger 305 (instead of configuring PRS monitoring occasions via higher layer signaling, such as RRC signaling). Trigger 305 may be a DCI, a MAC-CE, or the like. Trigger 305 may carry an indication of one or more PRS occasions 310. In some examples, trigger 305 may trigger UE 115 to monitor PRSs from multiple cells, if those cells have been informed ahead of time to begin transmitting their respective PRSs.

In some examples, trigger 305 may indicate a fixed number of PRS occasions 310. For instance, trigger 305 may initiate an aperiodic sounding reference signal (SRS) procedure, where the fixed number of PRS occasions 310 is equal to one. In some examples, a PRS procedure may be semi-persistent. In an illustrative and non-limiting example of semi-persistent SRS, trigger 305 may indicate a fixed set of three PRS occasions 310, including PRS occasion 310-*a*, PRS occasion 310-*b*, and PRs occasion 310-*c*. Each PRS occasion 310 may include one or more transmission time intervals (TTIs) (e.g., multiple OFDM symbols, slots, mini-slots, etc.). Multiple TTIs for each PRS occasion 310 may allow for beam repetition, beam sweeping, and the like. For instance, PRS occasion 310-*a* may include slot 315-*a*, slot 315-*b*, slot 315-*c*, and slot 315-*d*, PRS occasion 310-*b* may include slot 315-*e*, slot 315-*f*, slot 315-*g*, and slot 315-*h*, and PRS occasion 310-*c* may include slot 315-*i*, slot 315-*j*, slot 315-*k*, and slot 315-*l*. If UE 115 is capable of communicating via four beams, for example, then UE 115 may perform a four-beam sweep during the four slots 315 of each PRS occasion 310. Or, if UE 115 is capable of communicating via two beams, for example, then UE 115 may perform a two-beam sweep during the first two slots 315 of each PRS occasion 310, and then may repeat the two-beam sweep during the next two slots 315 of each PRS occasion.

UE 115 may receive trigger 305, and may identify PRS occasions 310-*a*, 310-*b*, and 310-*c* based thereon. UE 115 may monitor for PRSs during PRS occasion 310-*a*, PRS occasion 310-*b*, and PRS occasion 310-*c*, where the fixed number of PRS occasions 310 is equal to three. Upon monitoring the last PRS occasion 310-*c* of the set of three PRS occasions 310, UE 115 may stop monitoring for PRSs. UE 115 may perform measurements on PRSs received from one or more base stations 105 during PRS occasions 310, and may transmit a report 320, including timing information, based on the measurements to serving base station 105. For instance, UE 115 may determine round trip times (RTTs) for PRSs from each of the one or more base stations 105. This information may be included in the report 320. Base station 105 may relay the received information to an LMF, and the LMF may use the information to determine the position of UE 115.

Figure 4:
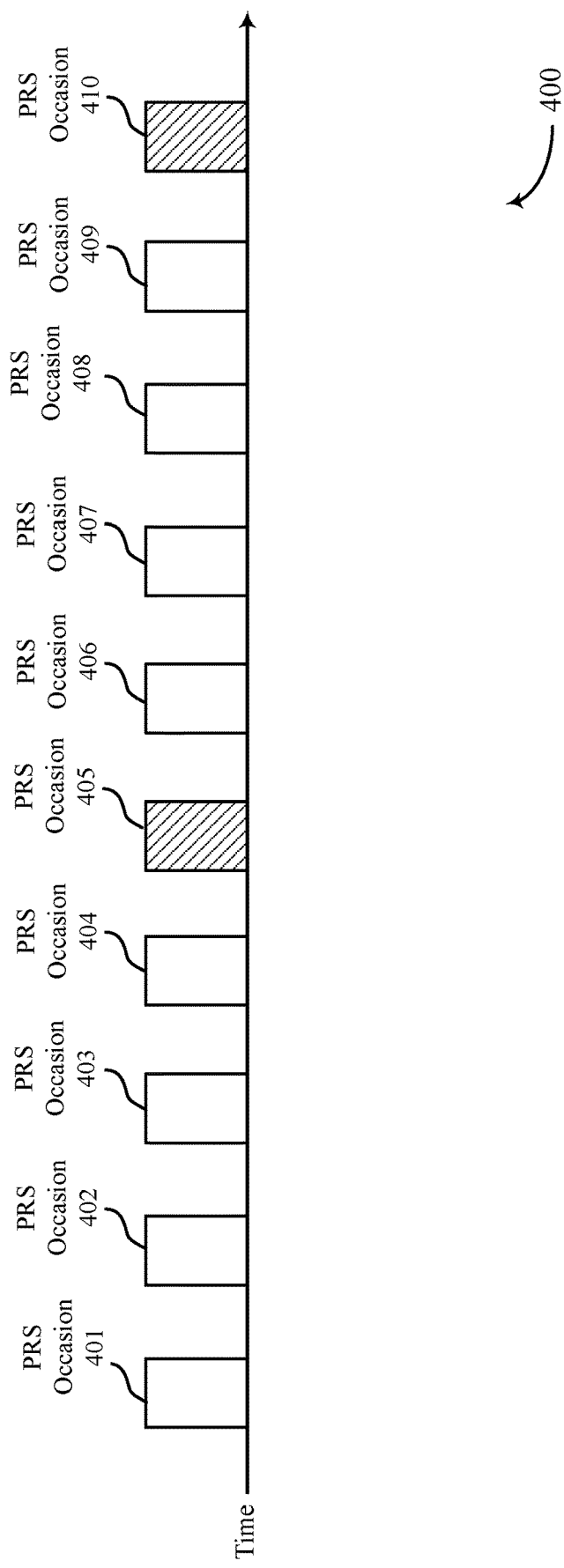
FIG. 4 illustrates an example of a timeline that supports aperiodic and cross component carrier PRSs in accordance with aspects of the present disclosure.

In some examples, trigger 305 may also include a muting pattern to be applied to the fixed number of PRS occasions 310, as described in greater detail with respect to FIG. 4.

FIG. 4 illustrates an example of a timeline 400 that supports aperiodic and cross component carrier PRSs in accordance with aspects of the present disclosure. In some examples, timeline 400 may implement aspects of wireless communications system 100.

In some examples, base station 105 may apply a flexible muting pattern to the set of PRS occasions described with respect to FIG. 3. A muting pattern may be a pattern of duty-cycling which has a longer period than a PRS period. Base station 105 may trigger (e.g., via a DCI, a MAC-CE, or the like) the muting pattern. In some examples, the trigger may also define the muting pattern. UE 115 may apply the indicated muting pattern to the PRS opportunities. That is, UE 115 may apply the muting pattern on top of the repeating PRS occasions, rather than monitoring for PRSs once every n slots as used to indicate the periodicity of periodic PRS. In some examples, multiple base stations 105 may communicate with each other (e.g., via Xn interfaces, or via the LMF), as described with respect to FIG. 2 and FIG. 5, and may coordinate downlink PRS signaling and muting patterns. That is, base stations 105 may communicate with each other to determine resources for repeating PRS occasions, as well as muting patterns as described herein with respect to FIG. 4.

In some examples, UE 115 may receive the trigger as described with respect to FIGS. 2 and 3, and may identify a set of PRS occasions. For instance, the trigger may indicate a set of ten PRS occasions, (e.g., PRS occasion 401, PRS occasion 402, PRs occasion 403, PRS occasion 404, PRS occasion 405, PRS occasion 406, PRS occasion 407, PRS occasion 408, PRS occasion 409, and PRS occasion 410). Each PRS occasion may be spaced a number of TTIs from each other (e.g., may have a periodicity of, for example, ten slots). Each PRS occasion may include one TTI, or multiple TTIs (e.g., for beam repetition, beam sweeping, or the like). UE 115 may monitor for PRSs during each of the PRS occasions or some of the PRS occasions, depending on a muting pattern received in the trigger. Muting patterns may be indicated as on or off for a number MPRS occasions out of every number NPRS occasions.

When a PRS occasion is muted for a base station 105, the base station 105 may refrain from sending a PRS during the muted PRS occasion. For example, if PRS occasion 405 is muted for a serving base station 105, the serving base station 105 may refrain from sending a PRS during PRS occasion 405. In some examples, a muted PRS occasion may be muted for each coordinating base station 105. In such examples, none of the coordinating base stations 105 may send PRSs during the muted PRS occasion. Muting a PRS occasion for all coordinating base stations 105 may improve PRS reception at a UE 115 by allowing non-coordinating base stations 105 to send signals (e.g., PRSs for other UEs 115) during the muted PRS occasion. In such examples, UE 115 may refrain from monitoring at all during the muted PRS occasion. In some examples, a muted PRS occasion may be muted for only one or only some of the base stations 105. This may avoid PRS collisions and may increase the likelihood that UE 115 will successfully receive a transmitted PRS from a particular base station 105. For instance, PRS occasion 405 may be muted for a non-serving base station 105. During PRS occasion 405, a non-serving base station 105 may refrain from transmitting a PRS due to the muting pattern. But, during PRS occasion 405, a serving base station 105 that is not muted may transmit a PRS, increasing the likelihood that UE 115 will successfully receive the PRS and perform measurements thereon. In some examples, coordinating base stations 105 may stagger PRS occasion muting to avoid PRS collisions. For instance, the serving base station 105 may be muted during PRS occasion 410 and may refrain from transmitting a PRS, and the non-serving base station 105 may not be muted during PRS occasion 410 and may transmit a PRS. Thus, UE 115 may receive a PRS from the serving base station 105, without interference, during PRS occasion 405 and may receive a PRS from the non-serving base station 105, without interference, during PRS occasion 410.

In some examples, muting patterns may indicate that muting is off except at certain occasions. For instance, the muting pattern may indicate that muting is off for all PRS occasions except one out of every five PRS occasions (e.g., N=1, M=5). In such examples, muting may be off for four PRS occasions (e.g., PRS occasions 401-404) and muting may be on for one PRS occasion (e.g., PRS occasion 405). Similarly, for the next set of five PRS occasions, muting may be off for four PRS occasions (e.g., PRS occasions 406-409) and muting may be on for one PRS occasion (e.g., PRS occasion 410). In such examples, one or more base stations 105 may transmit during the four PRS occasions out of every five where muting is off, and may refrain from transmitting during the one PRS occasion out of every five where muting is on.

In some examples, muting patterns may indicate that muting is on except at certain occasions. For instance, the muting pattern may indicate that the muting is on for all PRS occasions except one out of every five PRS occasions (e.g., N=1, M=5). In such examples, muting may be on for four PRS occasions (e.g., PRS occasions 401-404) and muting may be off for one PRS occasion (e.g., PRS occasion 405). Similarly, for the next set of five PRS occasions, muting may be on for four PRS occasions (e.g., PRS occasions 406-409) and muting may be off for one PRS occasion (e.g., PRS occasion 410). In such examples, one or more base stations 105 may transmit during the one PRS occasions out of every five where muting is on, and may refrain from transmitting during the other four PRS occasion out of every five where muting is on. Thus, UE 115 may receive PRS signals during the one PRS occasion out of every five. In some examples, where base stations 105 are coordinating to avoid PRS collisions, one base station 105 may transmit a PRS during PRS occasion 405, and another base station 105 may transmit a PRS during PRS occasion 410. In some examples, this may result in additional system efficiency. For instance, one or more base station 105 may use the resources muted during PRS occasions 1-4 and PRS occasions 6-9 for other signaling.

In some examples, the trigger may also indicate an offset for the pattern. For example, the muting pattern may indicate that the muting is off for all PRS occasions except one out of every five PRS occasions (e.g., N=1, M=5). The trigger may further indicate an offset of four PRS occasions (e.g., K=4). The muting pattern may apply after the offset. Thus, UE 115 may monitor PRS occasion 401, PRS occasion 402, PRS occasion 403, and PRS occasion 404. At PRS occasion 405, UE 115 may apply the muting pattern. One or more of the base stations 105 may refrain from transmitting a PRS during PRS occasion 405. If all of the base stations 105 refrain from transmitting a PRS during PRS occasion 405, then UE 115 may refrain from monitoring during PRS occasion 405, which may result in increased power savings at UE 115. UE 115 may monitor for PRSs during PRS occasion 406, PRS occasion 407, and PRS occasion 409, and one or more base stations 105 may refrain from transmitting a PRS during muted PRS occasion 410. After the Muting pattern is over, in some examples, UE 115 may revert to default monitoring pattern (e.g., monitoring each PRS occasion of the fixed number of PRS occasions).

After the last PRS occasion of the fixed number of PRS occasions, UE 115 may transmit a report including timing information to a serving base station.

Figure 5:
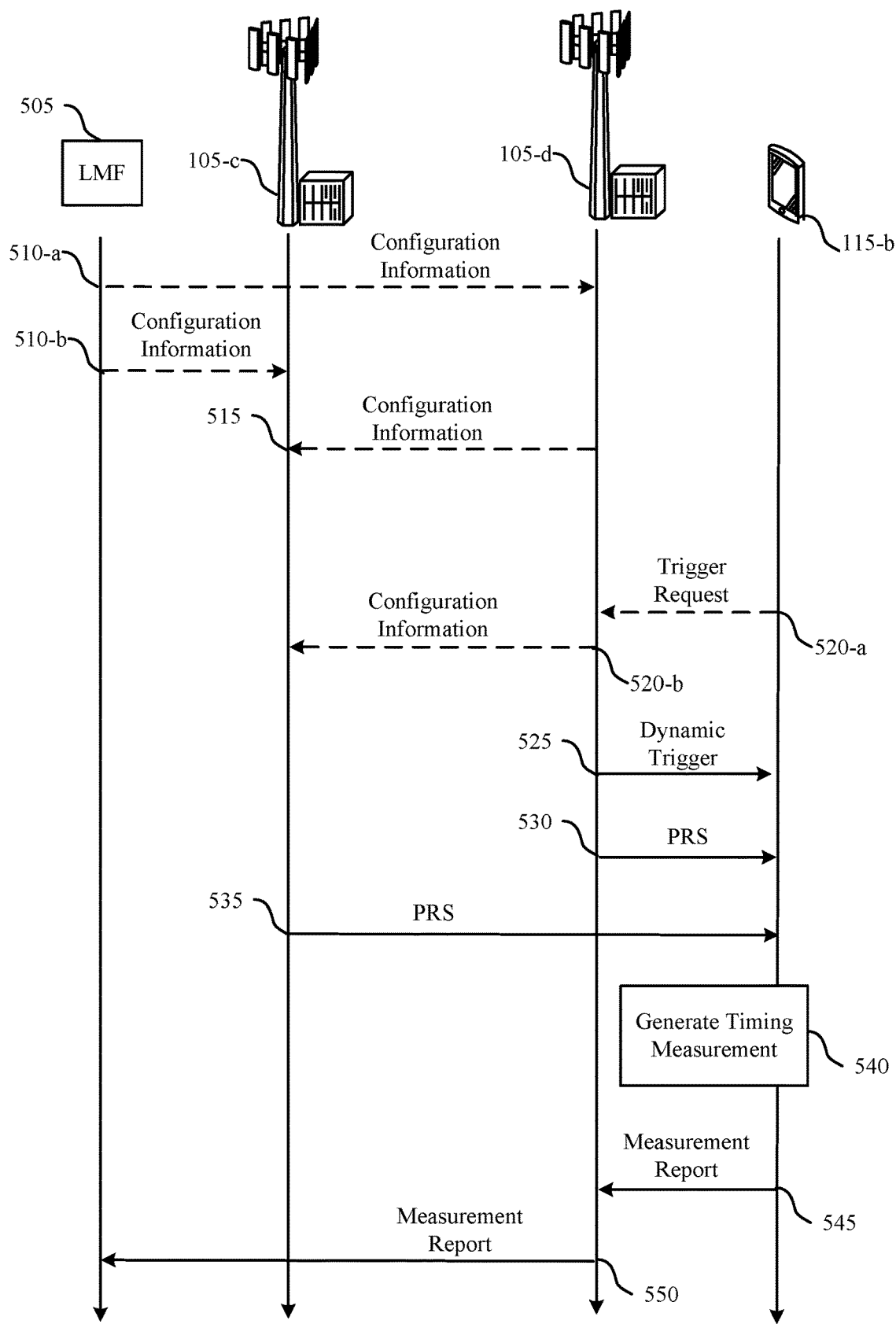
FIG. 5 illustrates an example of a process flow that supports aperiodic and cross component carrier PRSs in accordance with aspects of the present disclosure.

FIG. 5 illustrates an example of a process flow 500 that supports aperiodic and cross component carrier PRSs in accordance with aspects of the present disclosure. In some examples, process flow 500 may implement aspects of wireless communications system 100.

In some examples, LMF 505 may initiate or cause gNBs to initiate PRS signaling. At 510-*a*, LMF 505 may send PRS configuration information to base station 105-*d*. The configuration information may include resources for sending PRSs on (e.g., at 530). At 510-*b*, LMF 505 may send PRS configuration information to base station 105-*c*. The configuration information may include resources for sending PRSs on (e.g., at 535). Similarly, the PRS configuration information may include a muting pattern, which may be applied to the transmission of PRSs at 530 and 535, respectively. In some examples, UE 115-*b* may initiate an emergency phone call, and an emergency response center may request positioning information from UE 115-*b*. LMF 505 may initiate positioning procedures based on the request.

In some examples, a serving base station 105-*d* may initiate PRS signaling. At 515, base station 105-*d* may send PRS configuration information to base station 105-*c*. In some examples, base station 105-*d* may send the configuration information via a backhaul link. The configuration information may include resources for sending PRSs on (e.g., at 535).

In some examples, UE 115-*b* may initiate PRS signaling. At 520-*a*, UE 115-*b* may send a trigger request. The trigger request may indicate that UE 115-*b* requests a dynamic trigger and subsequent transmission of PRSs. At 520-*b*, base station 105-*d* may send PRS configuration information to base station 105-*c* to coordinate transmission of downlink PRSs from base station 105-*d* with downlink transmission of downlink PRSs from base station 105-*c*. The configuration information may include resources for sending PRSs on (e.g., at 535), such as multiple PRS occasions. Similarly, the PRS configuration information may include a muting pattern, which may be applied to the transmission of PRSs at 530 and 535, respectively.

At 525 base station 105-*d* may send a dynamic trigger to UE 115-*b*. The dynamic trigger may indicate that UE 115-*b* is to monitor for downlink PRSs from base station 105-*d*. In some examples, the dynamic trigger may further indicate that UE 115-*b* is to monitor for downlink PRSs from additional base stations 105 (e.g., base station 105-*c*). The dynamic trigger may be a MAC-CE, a DCI, or may include both.

In some examples, the dynamic trigger may indicate a PRS occasion to monitor for PRSs. The dynamic trigger may further indicate a duration of a PRS. THE duration of the PRS may be at least on TTI, such as a symbol period, a mini-slot, a slot, or the like. In some examples, the dynamic trigger may indicate a defined or fixed number of PRS occasions to monitor for downlink PRSs.

In some examples, the dynamic trigger may indicate a muting pattern. UE 115-b may determine to monitor for downlink PRSs during a PRS occasion based on the muting pattern. In some examples, a UE 115-b may skip monitoring during a PRS occasion based on the muting pattern.

At 530, base station 105-d may transmit one or more PRSs. Base station 105-d may transmit the one or more PRSs during PRS occasions (e.g., as indicated in the dynamic trigger 525, and as indicated in configuration information sent at 520-b).

At 535, base station 105-c may transmit one or more PRSs. Base station 105-c may transmit the one or more PRSs during PRS occasions (e.g., as indicated in the dynamic trigger 525, and as indicated in configuration information sent at 520-b).

In some examples, UE 115-b may deactivate monitoring for downlink PRSs subsequent to a last PRS occasion of the defined number of PRS occasions indicated in the dynamic trigger at 525.

At 540, UE 115-b may generate timing measurements for downlink PRSs based on receiving the dynamic trigger at 525. In some examples, UE 115-b may generate respective timing measurements for respective downlink PRSs (e.g., a timing measurement for the PRS received at 530 and a timing measurement for the PRS received at 535).

At 545, UE 115-b may send a measurement report to base station 105-d that indicates the timing measurements generated at 540. In some examples, the measurement report may include at least one of the respective timing measurements, or all of the respective timing measurements for each PRS received at 530 and 535. In some examples, base station 105-d may determine a location estimate for UE 115-b based on the measurement report.

At 550, base station 105-d may transmit the measurement report received at 545 to the LMF 505. In some examples, LMF 505 may determine a location estimate for UE 115-b based on the measurement report.

Figure 6:
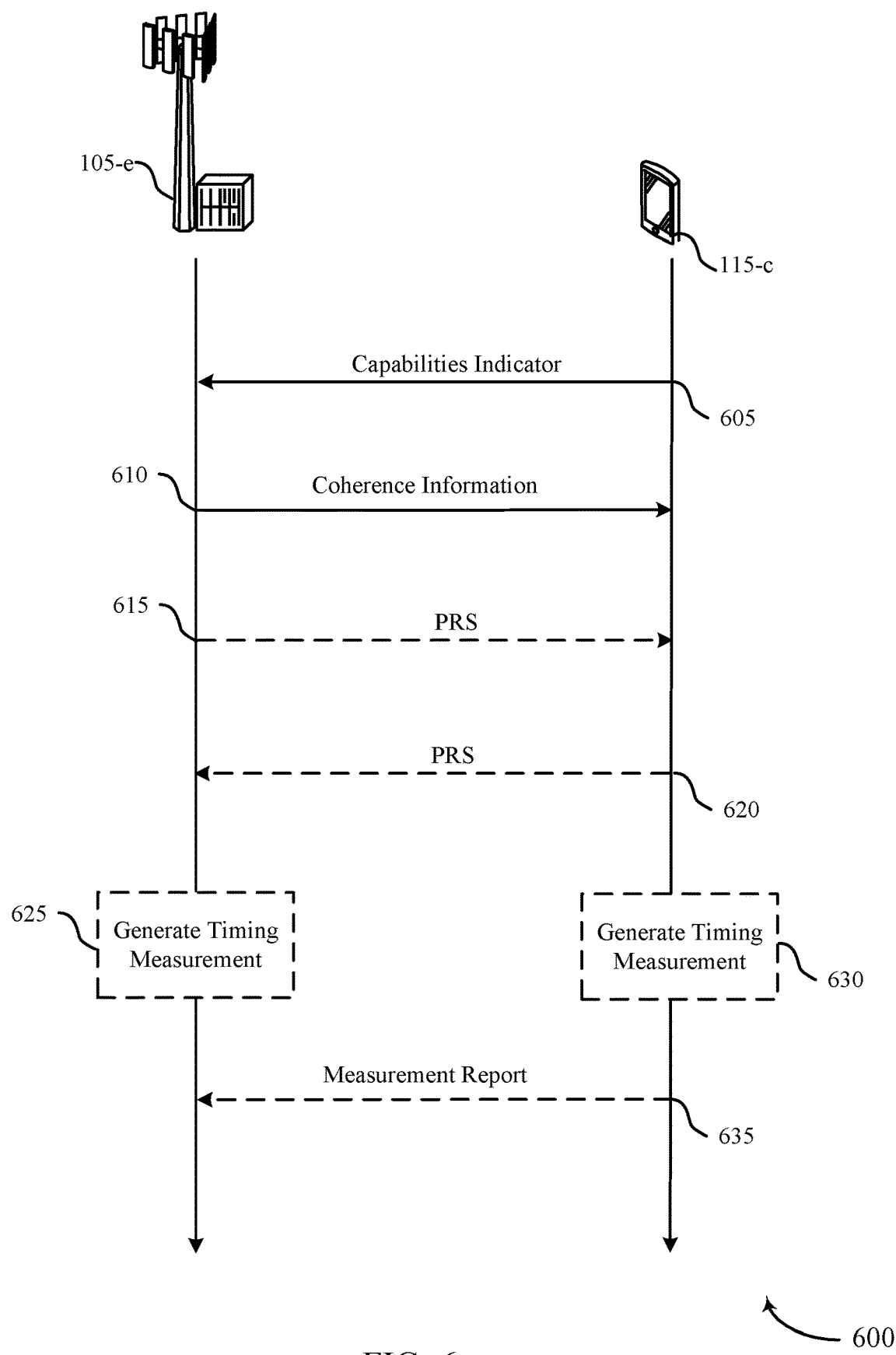
FIG. 6 illustrates an example of a process flow that supports aperiodic and cross component carrier PRSs in accordance with aspects of the present disclosure.

FIG. 6 illustrates an example of a process flow 600 that supports aperiodic and cross component carrier PRSs in accordance with aspects of the present disclosure. In some examples, process flow 600 may implement aspects of wireless communications system 100.

In the above description, MAC-CE and DCI have been referred to as examples of dynamic triggers for transmitting or receiving PRS. MAC-CE and DCI are issued by gNBs, for which gNBs are aware of relevant information about the ongoing positioning session. Under conventional operations (e.g., conventional LTE and NR operations), conventional gNBs may not be aware of an ongoing positioning session because the session is established directly between the LMF and the UE via LPP.

In the examples described herein, gNBs can be made aware of relevant information about an ongoing positioning session via relevant signaling (e.g., via LPPa between gNB and LMF). As another example, the dynamic trigger may be an RRC, LPP, or LPPa message that indicates transmission or reception of PRS for a defined (e.g., limited) number of occasions. In particular, if the number of occasions is 1, it is similar to an aperiodic transmission/reception, although it may, in some examples, not enjoy the low-latency benefits of MAC-CE or DCI.

In some examples, one or more base stations 105 (e.g., base station 105-e) and a UE 115-b may support cross component carrier channel-stitching. That is, a base station 105-e may transmit a PRS that spans multiple component carriers. This may improve positioning accuracy by providing a larger bandwidth. However, for a UE 115-c to successfully receive and decode PRSs, PRSs spanning multiple component carriers may be coherent (e.g., may use the same antenna port such that joint channel estimation is possible).

In some examples, coherence may be difficult to maintain. For instance, base station 105-e may transmit one or more PRS spanning different component carriers, but may use a different radio frequency chain for each of the multiple component carriers (e.g., in inter-band carrier aggregation cases, or in intra-band carrier aggregation cases when using frequencies included in a first frequency range FR1 in NR). In such cases, phase coherence across radio frequency chains may not be possible or otherwise guaranteed. Additionally, or alternatively, base station 105-e may perform tuning or returning of a bandwidth, transition between downlink transmissions and uplink transmissions, may change a transmit power or assigned resource block for uplink transmissions for UE 115-c, or the like. Any of these changes may result in a loss of phase coherence. In some examples, a change in assigned resource blocks may translate to a change in power because digital gains may be adjusted to compensate for different analog filter responses at different sets of assigned resource blocks.

A UE may be capable or incapable to maintain phase coherence while receiving PRSs that span multiple component carriers. This capability may be defined as a performance capability for a base station 105-e or a UE 115-c. For instance, performance capability may include a partial coherent processing capability. In such examples, a UE 115-c may experience a loss of coherence upon receiving a multi-carrier PRS, even though base station 105-e may experience no loss of coherence upon transmitting the same PRS. That is, UE 115-c may receive a multi-carrier PRS across a number of TTIS (e.g., two symbols). UE 115-c may expect to receive the PRS at a certain phase or phase offset across both symbols. However, UE 115-c may determine a phase offset between the first and second symbol for part or all of the PRS, resulting in loss of phase coherence. In such examples, where the performance capability of UE 115-c includes partial coherent processing capability, UE 115-c may estimate an expected phase coherence between component carriers for the PRS, and may attempt to correct for the coherence loss across the component carriers based on the estimation. In some examples, the estimation may be based on a set of coherence hypotheses, which may be based on information transmitted to UE 115-c from base station 105-e. In some examples, a lower or lowest performance capability may include a UE 115-c that is only capable of processing one component carrier at any given PRS occasion.

In some examples, base station 105-e and UE 115-c may communicate regarding UE performance capabilities, and phase coherence assumptions, which may be used to improve positioning procedures and cross component carrier channel stitching.

In some examples (e.g., in the case of downlink PRS signaling), at 605, UE 115-c may transmit a capabilities indicator to base station 105-e. The capabilities indicator may indicate performance capabilities, which may depend on a band or bandwidth for transmission, receiving, or both. In some examples, UE positioning accuracy performance may depend on UE capabilities (e.g., a capability of the UE to maintain phase coherence). In some examples, even signals indicated by base station 105-e to be coherent may translate to higher positioning accuracy performance in instances where a UE is capable of coherently processing them (e.g., according to indicated capabilities in the capabilities indicator).

The capabilities indicator may indicate that UE 115-e is capable of maintaining phase coherence for a PRS that spans multiple component carriers. The capabilities indicator may indicate one or more events under which the UE is capable of maintaining phase coherence for the PRS signal that spans multiple component carriers. The event may be a bandwidth retuning event, a downlink to uplink transition event, an uplink to downlink transition event, a change in transmission power event, a change in assigned resource block event, or any combination thereof. In some examples, the capabilities indicator may indicate an event under which the UE is not capable of maintaining phase coherence for the PRS signal that spans multiple component carriers. The capabilities indicator may indicate partial coherent processing capability, or single component carrier processing capability. In some examples, the capability indicator may indicate one or more of a band specific capability, a transmission capability, a reception capability, or any combination thereof.

At 610, base station 105-e may transmit coherence information. The coherence information may indicate which downlink signals across component carriers can be assumed to be phase coherent. In some examples, the coherence information may include control signaling indicating multiple component carriers on which the PRS is phase coherent based on the capability indicator received by base station 105-e at 605. In some examples, UE 115-c may determine or identify that a guard band is reduced or removed for the PRS that spans multiple component carriers during a same TTI with intra-band carrier aggregation. In some examples, UE 115-c may be configured (e.g., via higher layer signaling) to determine whether the guard band between the component carriers is reduced or removed. In some examples, base station 105-e may transmit configuration information indicating the that the guard band is reduced or removed. The configuration information may be included in the coherence information received at 610, in additional control signaling, or a guard band indicator transmitted separately or together with the coherence information.

At 615, base station 105-e may transmit a PRS that spans the multiple component carriers based at least in part on the control signaling transmitted at 610. UE 115-c may monitor for and receive the PRS based at least in part on the control signaling.

At 630, UE 115-c may generate a timing measurement for the PRS that spans the multiple component carriers based on the control signaling received at 610. In some examples, (e.g., where UE 115-c reported partial coherent processing capabilities at 605, UE 115-c may perform partial coherent processing on a received PRS that spans multiple component carriers. For instance, UE 115-c may identify at least a partial coherence loss for the PRS within a component carrier or multiple component carriers. UE 115-c may estimate a phase offset for the PRS within the component carrier or multiple component carriers, and may correct for the partial coherence loss based on the phase offset. In some examples, the timing measurement may be based on the correcting.

At 635, UE 115-c may transmit a measurement report to base station 105-e. The measurement report may indicate the timing measurement generated at 630.

In some examples (e.g., in the case of uplink PRS signaling), at 605, UE 115-c may transmit a capabilities indicator to base station 105-e. The capabilities indicator may indicate performance capabilities, which may depend on a band or bandwidth for transmission, receiving, or both. In some examples, UE positioning accuracy performance may depend on UE capabilities (e.g., a capability of the UE to maintain phase coherence). In some examples, even signals indicated by base station 105-e to be coherent may translate to higher positioning accuracy performance in instances (e.g., only in instances) where a UE is capable of coherently processing them (e.g., according to indicated capabilities in the capabilities indicator), and may translate to lower accuracy in other instances when the UE is not thus capable. The accuracy and granularity of the positioning-related measurement reports of the UE and/or the gNB may thus be a function of this capability, e.g., a higher measurement accuracy may be reported and a finer reporting granularity may be used in the occasions when the capability allows the larger-bandwidth processing.

The capabilities indicator may indicate that UE 115-e is capable of maintaining phase coherence for a PRS that spans multiple component carriers. The capabilities indicator may indicate one or more events under which the UE is capable of maintaining phase coherence for the PRS signal that spans multiple component carriers. The event may be a bandwidth retuning event, a downlink to uplink transition event, an uplink to downlink transition event, a change in transmission power event, a change in assigned resource block event, or any combination thereof. In some examples, the capabilities indicator may indicate an event under which the UE is not capable of maintaining phase coherence for the PRS signal that spans multiple component carriers. The capabilities indicator may indicate partial coherent processing capability, or single component carrier processing capability. In some examples, the capability indicator may indicate one or more of a band specific capability, a transmission capability, a reception capability, or any combination thereof.

At 610, base station 105-e may transmit coherence information to UE 115-c. The coherence information may indicate which uplink signals across component carriers can be assumed to be phase coherent. In some examples, the coherence information may include control signaling indicating multiple component carriers on which an uplink PRS is phase coherent based on the capability indicator received by base station 105-e at 605. In some examples, the configuration indicator may indicate that UE 115-c may use an inter component carrier guard band for transmitting the uplink PRS that spans multiple component carriers. In some examples, UE 115-c may be configured (e.g., via higher layer signaling) to determine whether to use an inter component carrier guard band for transmitting the uplink PRS that spans multiple component carriers.

At 620, UE 115-c may transmit a PRS that spans the multiple component carriers based at least in part on the control signaling received at 610. Base station 105-e may monitor for and receive the PRS based at least in part on the control signaling. In some examples, where the coherence information indicates that UE 115-c may use an inter component carrier guard band for transmitting the uplink PRS that spans multiple component carriers, base station 105-e may monitor the guard band for the PRS.

At 625, base station 105-e may generate a timing measurement for the uplink PRS received at 620. Upon generating the timing measurement, base station 105-e may transmit a measurement report including the generated timing measurements to a positioning server. In some examples, base station 105-e may determine a location estimate for the UE 115-c based at least in part on the timing measurement.

Figure 7:
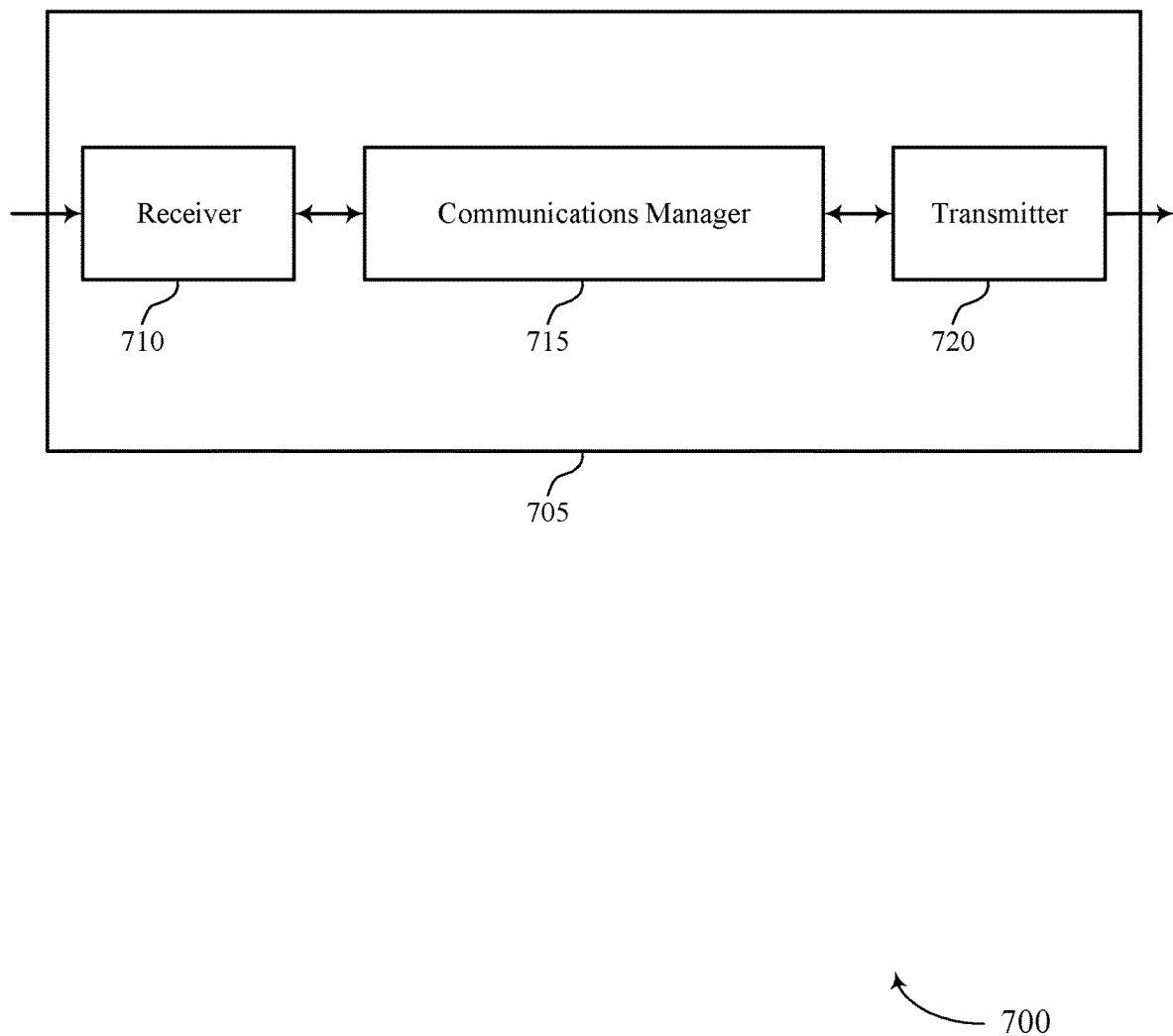
FIGS. 7 and 8 show block diagrams of devices that support aperiodic and cross component carrier PRSs in accordance with aspects of the present disclosure.

FIG. 7 shows a block diagram 700 of a device 705 that supports aperiodic and cross component carrier PRSs in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses). In some examples, communications manager 715 may be implemented by a wireless modem. Communications manager 715 may communicate with transmitter 720 via a first interface. Communications manager 715 may output signals for transmission via the first interface. In some examples, communications manager 715 may obtain signals received by receiver 710 from another wireless device via a second interface. The wireless modem may implement aspects of the techniques described herein, which may result in freeing up additional computing resources for increased efficiency, allowing the device to stop monitoring for PRSs sooner, increasing the battery life of the device, etc.

The receiver 710 may receive information such as packets, user data, or control information associated with various information channels (e.g., control channels, data channels, and information related to aperiodic and cross component carrier PRSs, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a dynamic trigger that indicates that the UE is to monitor for a downlink PRS from a base station, generate a timing measurement for the downlink PRS based on the dynamic trigger, and transmit a measurement report that indicates the timing measurement. The communications manager 715 may also transmit a capability indicator that indicates the UE is capable of maintaining phase coherence for a PRS that spans multiple component carriers, receive control signaling indicating a set of component carriers on which the PRS is phase coherent based on the capability indicator, generate a timing measurement for the PRS that spans the set of component carriers based on the control signaling, and transmit a measurement report that indicates the timing measurement. The communications manager 715 may also transmit a capability indicator that indicates the UE is capable of maintaining phase coherence for a PRS that spans multiple component carriers, receive control signaling indicating a set of component carriers on which the PRS is phase coherent based on the capability indicator, and transmit the PRS that spans the set of component carriers based on the control signaling. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may result in increased system efficiency, and decreased power consumption. Decreased power consumption may allow for extended battery life for a UE 115. System latency may also be decreased, resulting in improved user experience.

Based on techniques for efficiently communicating maximum number of layers for a device as described herein, a processor of a UE 115 (e.g., controlling the receiver 410, the transmitter 420, or a transceiver 720 as described with respect to FIG. 7) may increase system efficiency and decrease unnecessary processing at a device.

Figure 8:
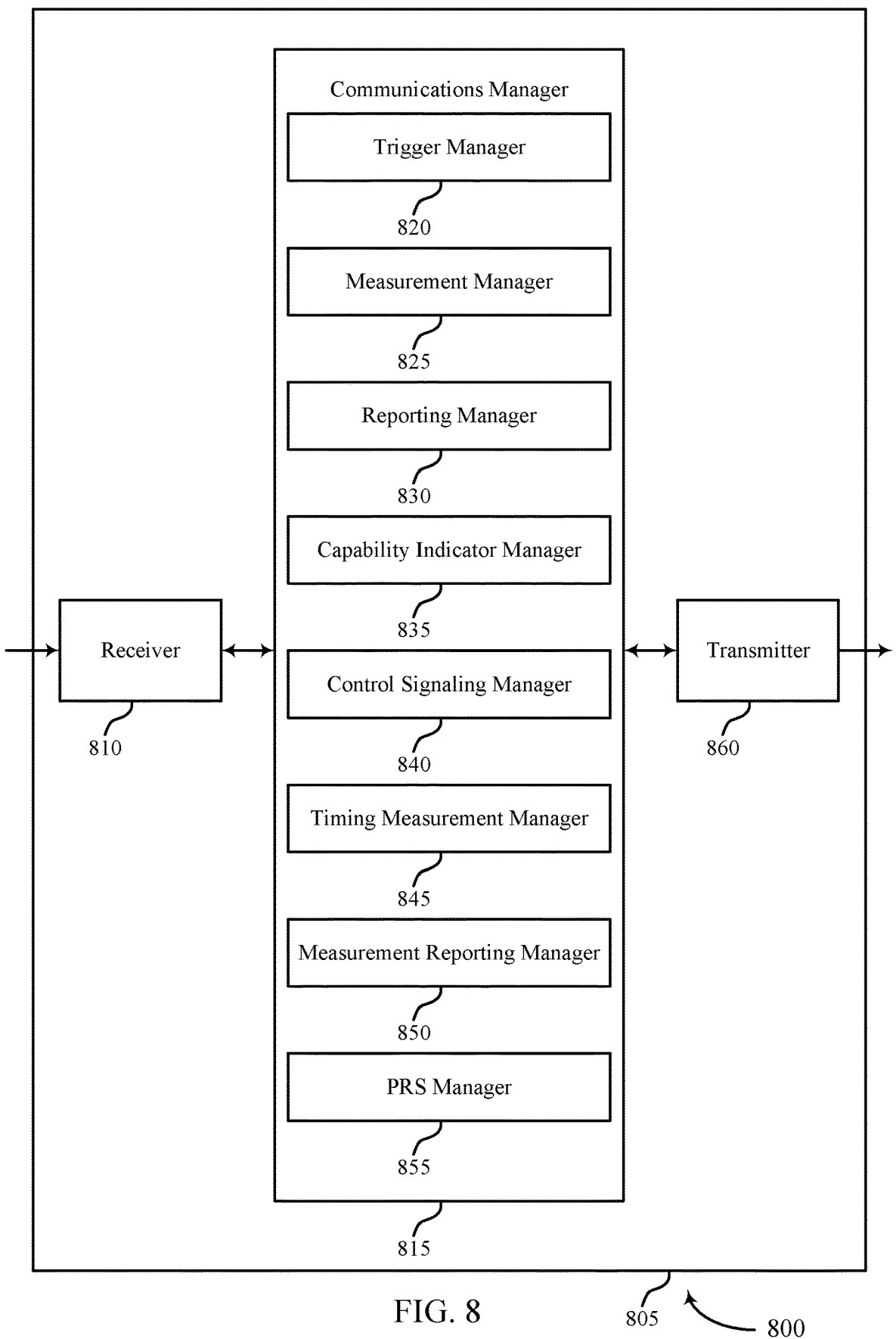

FIG. 8 shows a block diagram 800 of a device 805 that supports aperiodic and cross component carrier PRSs in accordance with aspects of the present disclosure. The device 805 may be an example of aspects of a device 705, or a UE 115 as described herein. The device 805 may include a receiver 810, a communications manager 815, and a transmitter 860. The device 805 may also include a processor. Each of these components may be in communication with one another (e.g., via one or more buses).

The receiver 810 may receive information such as packets, user data, or control information associated with various information channels (e.g., control channels, data channels, and information related to aperiodic and cross component carrier PRSs, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a trigger manager 820, a measurement manager 825, a reporting manager 830, a capability indicator manager 835, a control signaling manager 840, a timing measurement manager 845, a measurement reporting manager 850, and a PRS manager 855. The communications manager 815 may be an example of aspects of the communications manager 1010 described herein.

The trigger manager 820 may receive a dynamic trigger that indicates that the UE is to monitor for a downlink PRS from a base station.

The measurement manager 825 may generate a timing measurement for the downlink PRS based on the dynamic trigger.

The reporting manager 830 may transmit a measurement report that indicates the timing measurement.

The capability indicator manager 835 may transmit a capability indicator that indicates the UE is capable of maintaining phase coherence for a PRS that spans multiple component carriers.

The control signaling manager 840 may receive control signaling indicating a set of component carriers on which the PRS is phase coherent based on the capability indicator.

The timing measurement manager 845 may generate a timing measurement for the PRS that spans the set of component carriers based on the control signaling.

The measurement reporting manager 850 may transmit a measurement report that indicates the timing measurement.

The capability indicator manager 835 may transmit a capability indicator that indicates the UE is capable of maintaining phase coherence for a PRS that spans multiple component carriers.

The control signaling manager 840 may receive control signaling indicating a set of component carriers on which the PRS is phase coherent based on the capability indicator.

The PRS manager 855 may transmit the PRS that spans the set of component carriers based on the control signaling.

The transmitter 860 may transmit signals generated by other components of the device 805. In some examples, the transmitter 860 may be collocated with a receiver 810 in a transceiver module. For example, the transmitter 860 may be an example of aspects of the transceiver 1020 described with reference to FIG. 10. The transmitter 860 may utilize a single antenna or a set of antennas.

Figure 9:
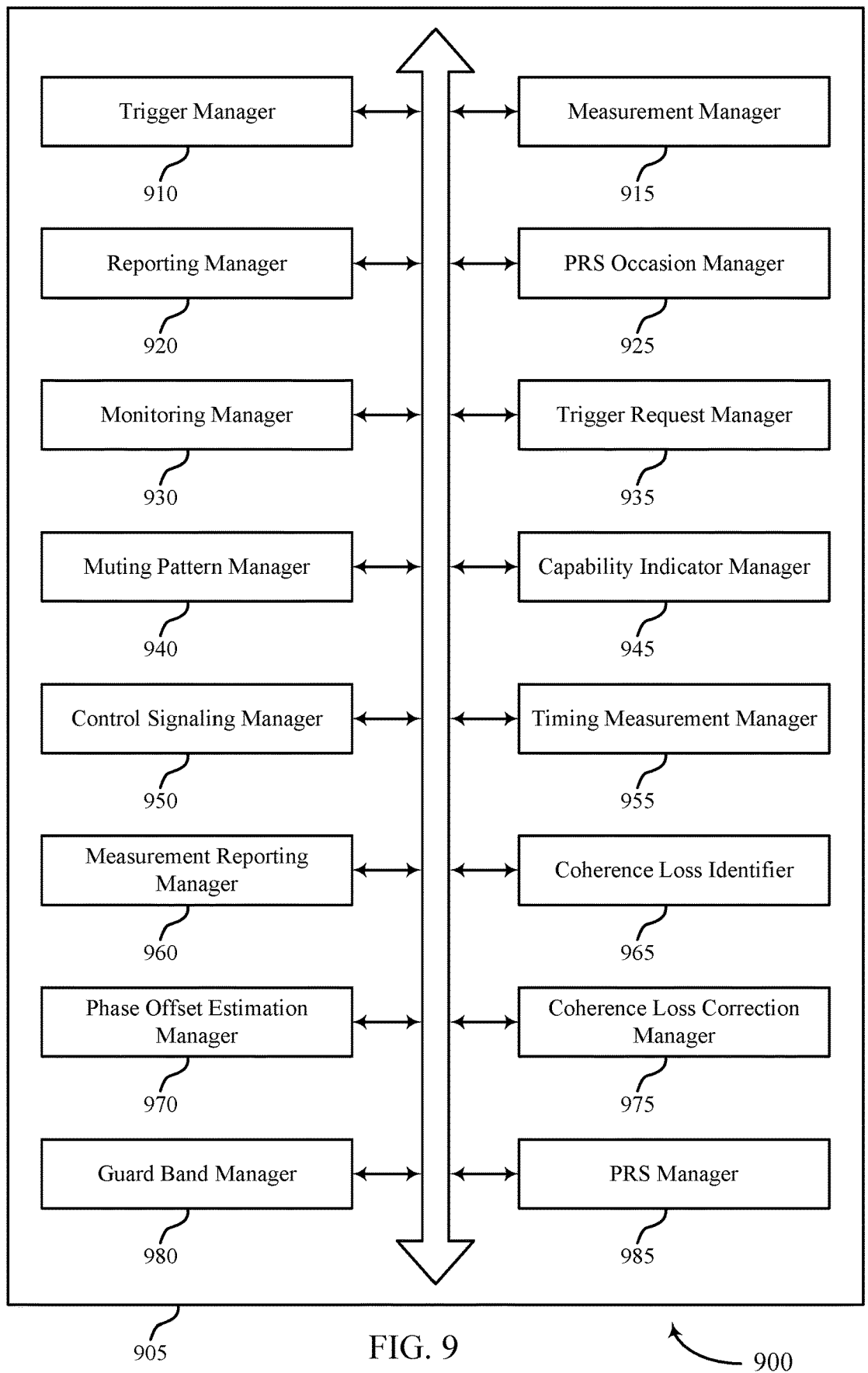
FIG. 9 shows a block diagram of a communications manager that supports aperiodic and cross component carrier PRSs in accordance with aspects of the present disclosure.

FIG. 9 shows a block diagram 900 of a communications manager 905 that supports aperiodic and cross component carrier PRSs in accordance with aspects of the present disclosure. The communications manager 905 may be an example of aspects of a communications manager 715, a communications manager 815, or a communications manager 1010 described herein. The communications manager 905 may include a trigger manager 910, a measurement manager 915, a reporting manager 920, a PRS occasion manager 925, a monitoring manager 930, a trigger request manager 935, a muting pattern manager 940, a capability indicator manager 945, a control signaling manager 950, a timing measurement manager 955, a measurement reporting manager 960, a coherence loss identifier 965, a phase offset estimation manager 970, a coherence loss correction manager 975, a guard band manager 980, and a PRS manager 985. Each of these modules may communicate, directly or indirectly, with one another (e.g., via one or more buses).

The trigger manager 910 may receive a dynamic trigger that indicates that the UE is to monitor for a downlink PRS from a base station. In some examples, the trigger manager 910 may receive a medium access control (MAC) control element (CE), downlink control information, or both, that indicates that the UE is to monitor for the downlink PRS. In some examples, the trigger manager 910 may receive the dynamic trigger that indicates to monitor for a respective downlink PRS from each base station of a set of base stations. In some examples, the trigger manager 910 may receive the dynamic trigger that indicates a PRS occasion to monitor for the downlink PRS. In some examples, the trigger manager 910 may receive the dynamic trigger that indicates a muting pattern.

The measurement manager 915 may generate a timing measurement for the downlink PRS based on the dynamic trigger. In some examples, the measurement manager 915 may generate a respective timing measurement for the respective downlink PRSs, where the measurement report indicates at least one of the respective timing measurements.

The reporting manager 920 may transmit a measurement report that indicates the timing measurement.

The capability indicator manager 945 may transmit a capability indicator that indicates the UE is capable of maintaining phase coherence for a PRS that spans multiple component carriers. In some examples, the capability indicator manager 945 may transmit a capability indicator that indicates the UE is capable of maintaining phase coherence for a PRS that spans multiple component carriers.

In some examples, the capability indicator manager 945 may transmit the capability indicator that indicates an event under which the UE is capable of maintaining phase coherence for the PRS that spans multiple component carriers.

In some examples, the capability indicator manager 945 may transmit the capability indicator that indicates an event under which the UE is not capable of maintaining phase coherence for the PRS that spans multiple component carriers. In some examples, the capability indicator manager 945 may transmit the capability indicator that indicates a partial coherent processing capability. In some cases, the event is a bandwidth retuning event, a downlink to uplink transition event, an uplink to downlink transition event, a change in transmission power event, a change in assigned resource block event, or any combination thereof. In some cases, the capability indicator indicates one or more of a band specific capability, a transmission capability, a reception capability, or any combination thereof.

The control signaling manager 950 may receive control signaling indicating a set of component carriers on which the PRS is phase coherent based on the capability indicator. In some examples, the control signaling manager 950 may receive control signaling indicating a set of component carriers on which the PRS is phase coherent based on the capability indicator.

The timing measurement manager 955 may generate a timing measurement for the PRS that spans the set of component carriers based on the control signaling.

The measurement reporting manager 960 may transmit a measurement report that indicates the timing measurement.

The PRS manager 985 may transmit the PRS that spans the set of component carriers based on the control signaling.

The PRS occasion manager 925 may receive the dynamic trigger that indicates that a duration of the PRS occasion is at least one transmission time interval. In some cases, each transmission time interval of the at least one transmission time interval is a symbol period, a mini-slot, or a slot.

The monitoring manager 930 may receive the dynamic trigger that indicates a defined number of PRS occasions to monitor for the downlink PRS. In some examples, the monitoring manager 930 may de-activate monitoring for the downlink PRS subsequent to a last PRS occasion of the defined number of PRS occasions. In some examples, the monitoring manager 930 may determine to monitor for the downlink PRS during a downlink PRS occasion based on the muting pattern.

The trigger request manager 935 may transmit a trigger request to the base station, where the dynamic trigger is received based on the trigger request.

The muting pattern manager 940 may receive the dynamic trigger that indicates a muting pattern.

In some examples, the muting pattern manager 940 may determine to skip monitoring for the downlink PRS during a downlink PRS occasion based on the muting pattern.

The coherence loss identifier 965 may identify at least a partial coherence loss for the PRS within at least one component carrier of the set of component carriers.

The phase offset estimation manager 970 may estimate a phase offset for the PRS within the at least one component carrier.

The coherence loss correction manager 975 may correct for the partial coherence loss based on the phase offset, where the timing measurement for the PRS that spans the set of component carriers is generated based on the correcting.

The guard band manager 980 may identify that a guard band is reduced or removed for the PRS that spans the set of component carriers on a same transmission time interval with intra-band carrier aggregation. In some examples, the guard band manager 980 may receive configuration signaling or a guard band indicator indicating that the guard band is reduced or removed. In some examples, the guard band manager 980 may receive configuration signaling indicating to use an inter component carrier guard band for transmitting the PRS, where the PRS that spans the set of component carriers is transmitted within the guard band.

Figure 10:
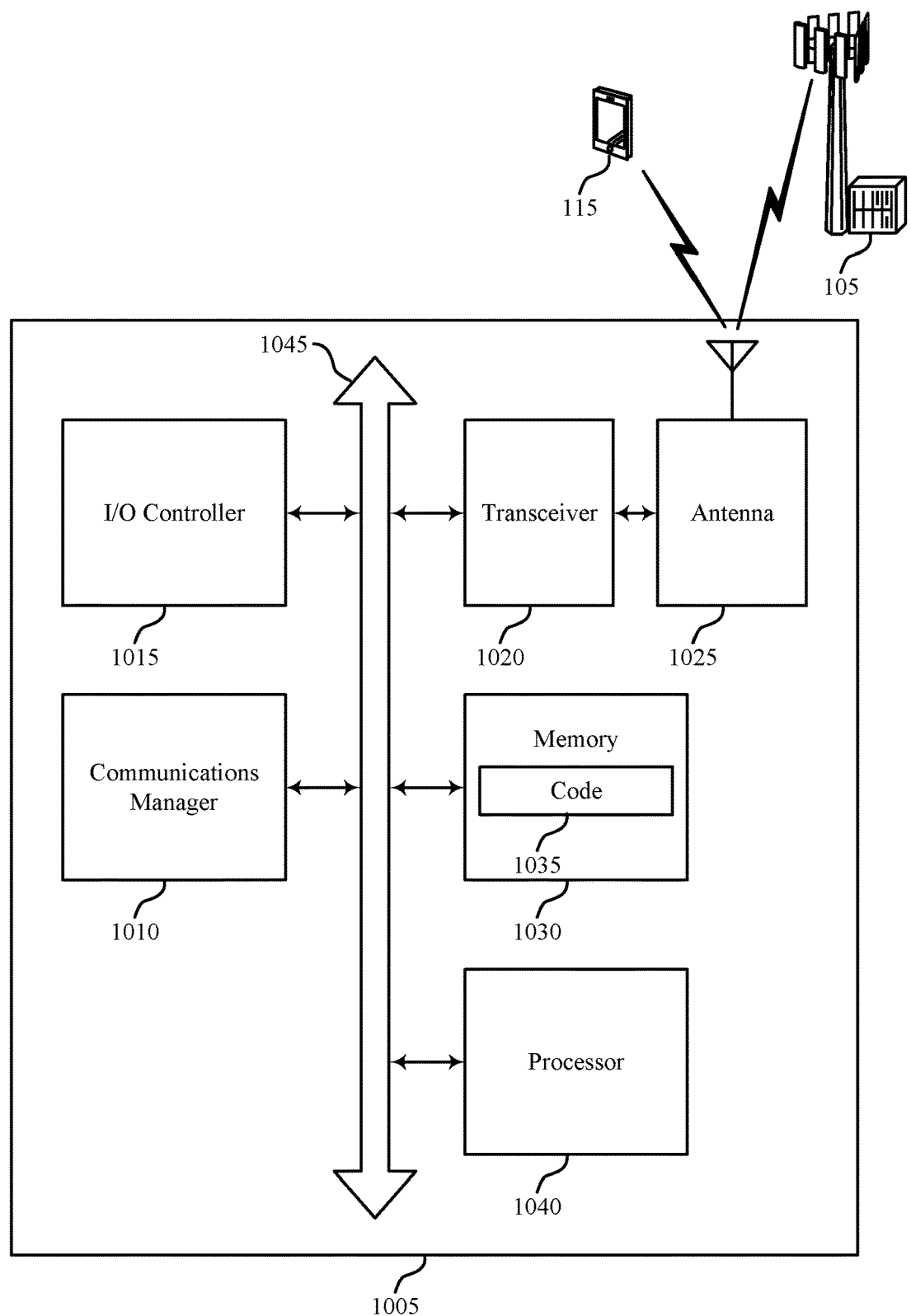
FIG. 10 shows a diagram of a system including a device that supports aperiodic and cross component carrier PRSs in accordance with aspects of the present disclosure.

FIG. 10 shows a diagram of a system 1000 including a device 1005 that supports aperiodic and cross component carrier PRSs in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a I/O controller 1015, a transceiver 1020, an antenna 1025, memory 1030, and a processor 1040. These components may be in electronic communication via one or more buses (e.g., bus 1045).

The communications manager 1010 may receive a dynamic trigger that indicates that the UE is to monitor for a downlink PRS from a base station, generate a timing measurement for the downlink PRS based on the dynamic trigger, and transmit a measurement report that indicates the timing measurement. The communications manager 1010 may also transmit a capability indicator that indicates the UE is capable of maintaining phase coherence for a PRS that spans multiple component carriers, receive control signaling indicating a set of component carriers on which the PRS is phase coherent based on the capability indicator, generate a timing measurement for the PRS that spans the set of component carriers based on the control signaling, and transmit a measurement report that indicates the timing measurement. The communications manager 1010 may also transmit a capability indicator that indicates the UE is capable of maintaining phase coherence for a PRS that spans multiple component carriers, receive control signaling indicating a set of component carriers on which the PRS is phase coherent based on the capability indicator, and transmit the PRS that spans the set of component carriers based on the control signaling.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting aperiodic and cross component carrier PRSs).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
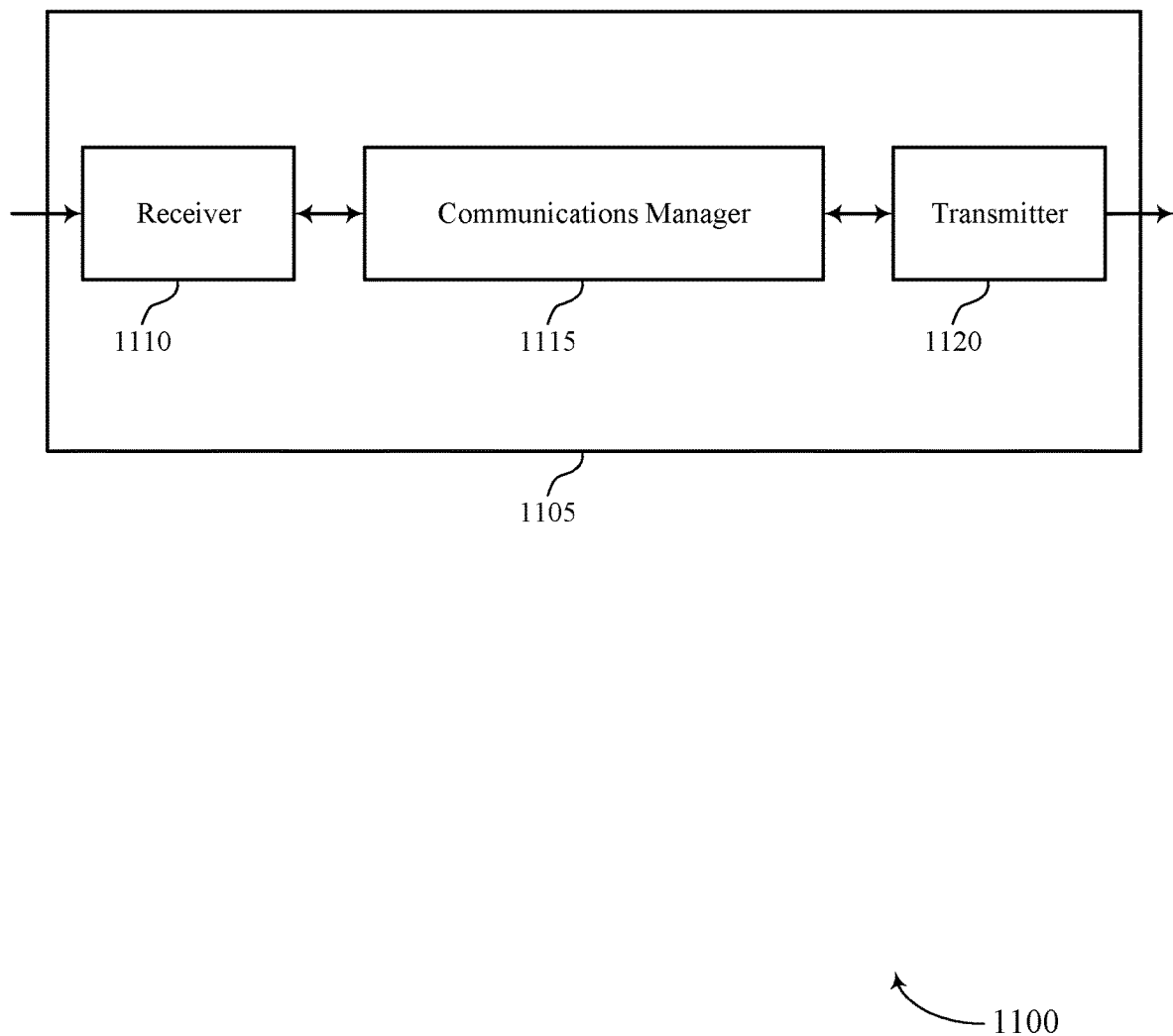
FIGS. 11 and 12 show block diagrams of devices that support aperiodic and cross component carrier PRSs in accordance with aspects of the present disclosure.

FIG. 11 shows a block diagram 1100 of a device 1105 that supports aperiodic and cross component carrier PRSs in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to aperiodic and cross component carrier PRSs, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a dynamic trigger that indicates that a UE is to monitor for a downlink PRS from a base station and receive a measurement report that indicates a timing measurement for the downlink PRS. The communications manager 1115 may also receive a capability indicator that indicates a UE is capable of maintaining phase coherence for a PRS that spans multiple component carriers, transmit control signaling indicating a set of component carriers on which the PRS is phase coherent based on the capability indicator, transmit the PRS that spans the set of component carriers based on the control signaling, and receive a measurement report that indicates a timing measurement for the PRS that spans the set of component carriers. The communications manager 1115 may also receive a capability indicator that indicates a UE is capable of maintaining phase coherence for a PRS that spans multiple component carriers, transmit control signaling indicating a set of component carriers on which the PRS by the UE is to be phase coherent based on the capability indicator, and generate a timing measurement for the PRS that spans the set of component carriers based on the control signaling. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
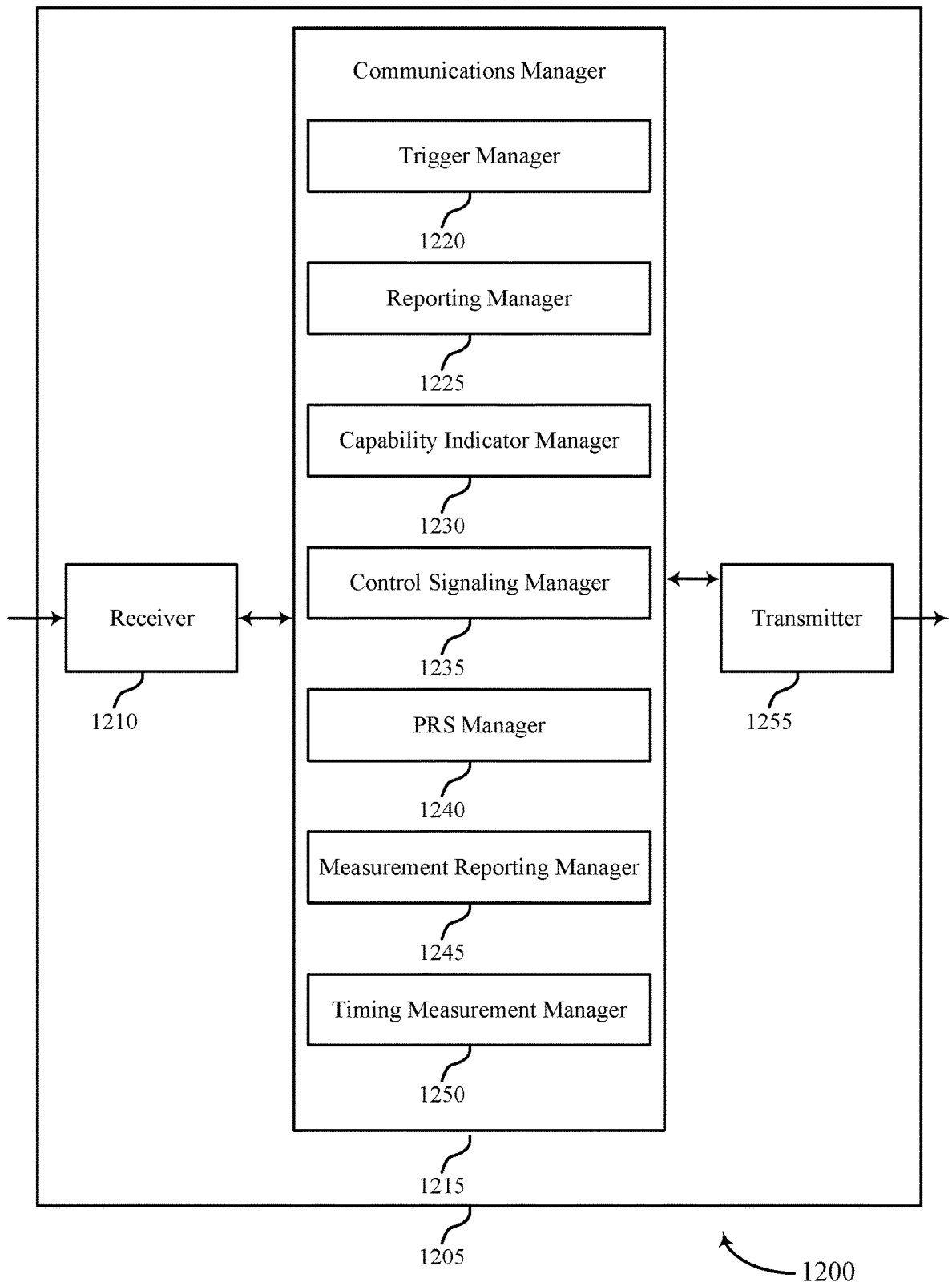

FIG. 12 shows a block diagram 1200 of a device 1205 that supports aperiodic and cross component carrier PRSs in accordance with aspects of the present disclosure. The device 1205 may be an example of aspects of a device 1105, or a base station 105 as described herein. The device 1205 may include a receiver 1210, a communications manager 1215, and a transmitter 1255. The device 1205 may also include a processor. Each of these components may be in communication with one another (e.g., via one or more buses).

The receiver 1210 may receive information such as packets, user data, or control information associated with various information channels (e.g., control channels, data channels, and information related to aperiodic and cross component carrier PRSs, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a trigger manager 1220, a reporting manager 1225, a capability indicator manager 1230, a control signaling manager 1235, a PRS manager 1240, a measurement reporting manager 1245, and a timing measurement manager 1250. The communications manager 1215 may be an example of aspects of the communications manager 1410 described herein.

The trigger manager 1220 may transmit a dynamic trigger that indicates that a UE is to monitor for a downlink PRS from a base station.

The reporting manager 1225 may receive a measurement report that indicates a timing measurement for the downlink PRS.

The capability indicator manager 1230 may receive a capability indicator that indicates a UE is capable of maintaining phase coherence for a PRS that spans multiple component carriers.

The control signaling manager 1235 may transmit control signaling indicating a set of component carriers on which the PRS is phase coherent based on the capability indicator.

The PRS manager 1240 may transmit the PRS that spans the set of component carriers based on the control signaling.

The measurement reporting manager 1245 may receive a measurement report that indicates a timing measurement for the PRS that spans the set of component carriers.

The capability indicator manager 1230 may receive a capability indicator that indicates a UE is capable of maintaining phase coherence for a PRS that spans multiple component carriers.

The control signaling manager 1235 may transmit control signaling indicating a set of component carriers on which the PRS by the UE is to be phase coherent based on the capability indicator.

The timing measurement manager 1250 may generate a timing measurement for the PRS that spans the set of component carriers based on the control signaling.

The transmitter 1255 may transmit signals generated by other components of the device 1205. In some examples, the transmitter 1255 may be collocated with a receiver 1210 in a transceiver module. For example, the transmitter 1255 may be an example of aspects of the transceiver 1420 described with reference to FIG. 14. The transmitter 1255 may utilize a single antenna or a set of antennas.

Figure 13:
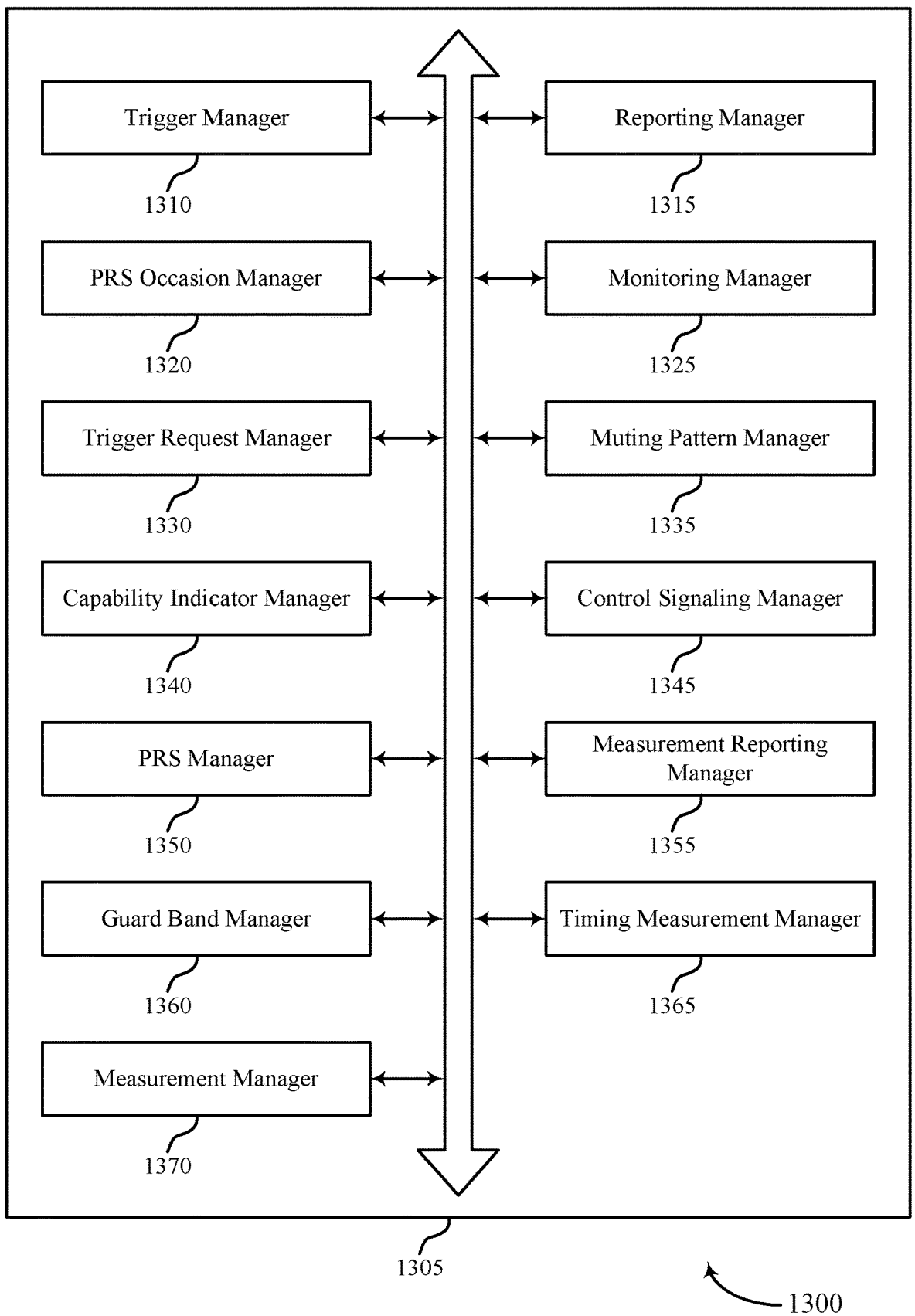
FIG. 13 shows a block diagram of a communications manager that supports aperiodic and cross component carrier PRSs in accordance with aspects of the present disclosure.

FIG. 13 shows a block diagram 1300 of a communications manager 1305 that supports aperiodic and cross component carrier PRSs in accordance with aspects of the present disclosure. The communications manager 1305 may be an example of aspects of a communications manager 1115, a communications manager 1215, or a communications manager 1410 described herein. The communications manager 1305 may include a trigger manager 1310, a reporting manager 1315, a PRS occasion manager 1320, a monitoring manager 1325, a trigger request manager 1330, a muting pattern manager 1335, a capability indicator manager 1340, a control signaling manager 1345, a PRS manager 1350, a measurement reporting manager 1355, a guard band manager 1360, a timing measurement manager 1365, and a measurement manager 1370. Each of these modules may communicate, directly or indirectly, with one another (e.g., via one or more buses).

The trigger manager 1310 may transmit a dynamic trigger that indicates that a UE is to monitor for a downlink PRS from a base station. In some examples, the trigger manager 1310 may transmit a medium access control MAC-CE, downlink control information, or both, that indicates that the UE is to monitor for the downlink PRS.

The reporting manager 1315 may receive a measurement report that indicates a timing measurement for the downlink PRS. In some examples, the reporting manager 1315 may transmit the measurement report to a positioning server. In some examples, the reporting manager 1315 may determine a location estimate for the UE based on the measurement report. In some cases, the measurement report indicates a respective timing measurement for the respective downlink PRSs.

The capability indicator manager 1340 may receive a capability indicator that indicates a UE is capable of maintaining phase coherence for a PRS that spans multiple component carriers. In some examples, the capability indicator manager 1340 may receive a capability indicator that indicates a UE is capable of maintaining phase coherence for a PRS that spans multiple component carriers. In some examples, the capability indicator manager 1340 may receive the capability indicator that indicates an event under which the UE is capable of maintaining phase coherence for the PRS that spans multiple component carriers. In some examples, the capability indicator manager 1340 may receive the capability indicator that indicates an event under which the UE is not capable of maintaining phase coherence for the PRS that spans multiple component carriers. In some examples, the capability indicator manager 1340 may receive the capability indicator that indicates a partial coherent processing capability. In some cases, the event is a bandwidth retuning event, a downlink to uplink transition event, an uplink to downlink transition event, a change in transmission power event, a change in assigned resource block event, or any combination thereof. In some cases, the capability indicator indicates one or more of a band specific capability, a transmission capability, a reception capability, or any combination thereof.

The control signaling manager 1345 may transmit control signaling indicating a set of component carriers on which the PRS is phase coherent based on the capability indicator. In some examples, the control signaling manager 1345 may transmit control signaling indicating a set of component carriers on which the PRS by the UE is to be phase coherent based on the capability indicator.

The PRS manager 1350 may transmit the PRS that spans the set of component carriers based on the control signaling.

The measurement reporting manager 1355 may receive a measurement report that indicates a timing measurement for the PRS that spans the set of component carriers. In some examples, the measurement reporting manager 1355 may transmit a measurement report that indicates the timing measurement to a positioning server.

The timing measurement manager 1365 may generate a timing measurement for the PRS that spans the set of component carriers based on the control signaling.

The PRS occasion manager 1320 may transmit a downlink PRS configuration to a second base station to coordinate transmission of the downlink PRS with transmission of a second downlink PRS by the second base station. In some examples, the PRS occasion manager 1320 may transmit the dynamic trigger that indicates that a duration of the PRS occasion is at least one transmission time interval.

In some examples, the PRS occasion manager 1320 may transmit the dynamic trigger that indicates a defined number of PRS occasions to monitor for the downlink PRS. In some cases, the downlink PRS configuration indicates a set of PRS occasions. In some cases, each transmission time interval of the at least one transmission time interval is a symbol period, a mini-slot, or a slot.

The monitoring manager 1325 may transmit the dynamic trigger that indicates to monitor for a respective downlink PRS from each base station of a set of base stations. In some examples, the monitoring manager 1325 may transmit the dynamic trigger that indicates a PRS occasion to monitor for the downlink PRS.

The trigger request manager 1330 may receive a trigger request from the UE, where the dynamic trigger is transmitted based on the trigger request.

The muting pattern manager 1335 may transmit the dynamic trigger that indicates a muting pattern.

The guard band manager 1360 may transmit configuration signaling or a guard band indicator indicating that a guard band is reduced or removed for the PRS that spans the set of component carriers on a same transmission time interval with intra-band carrier aggregation. In some examples, the guard band manager 1360 may transmit configuration signaling indicating that the UE is to use an inter component carrier guard band for transmitting the PRS.

The measurement manager 1370 may determine a location estimate for the UE based on the timing measurement.

Figure 14:
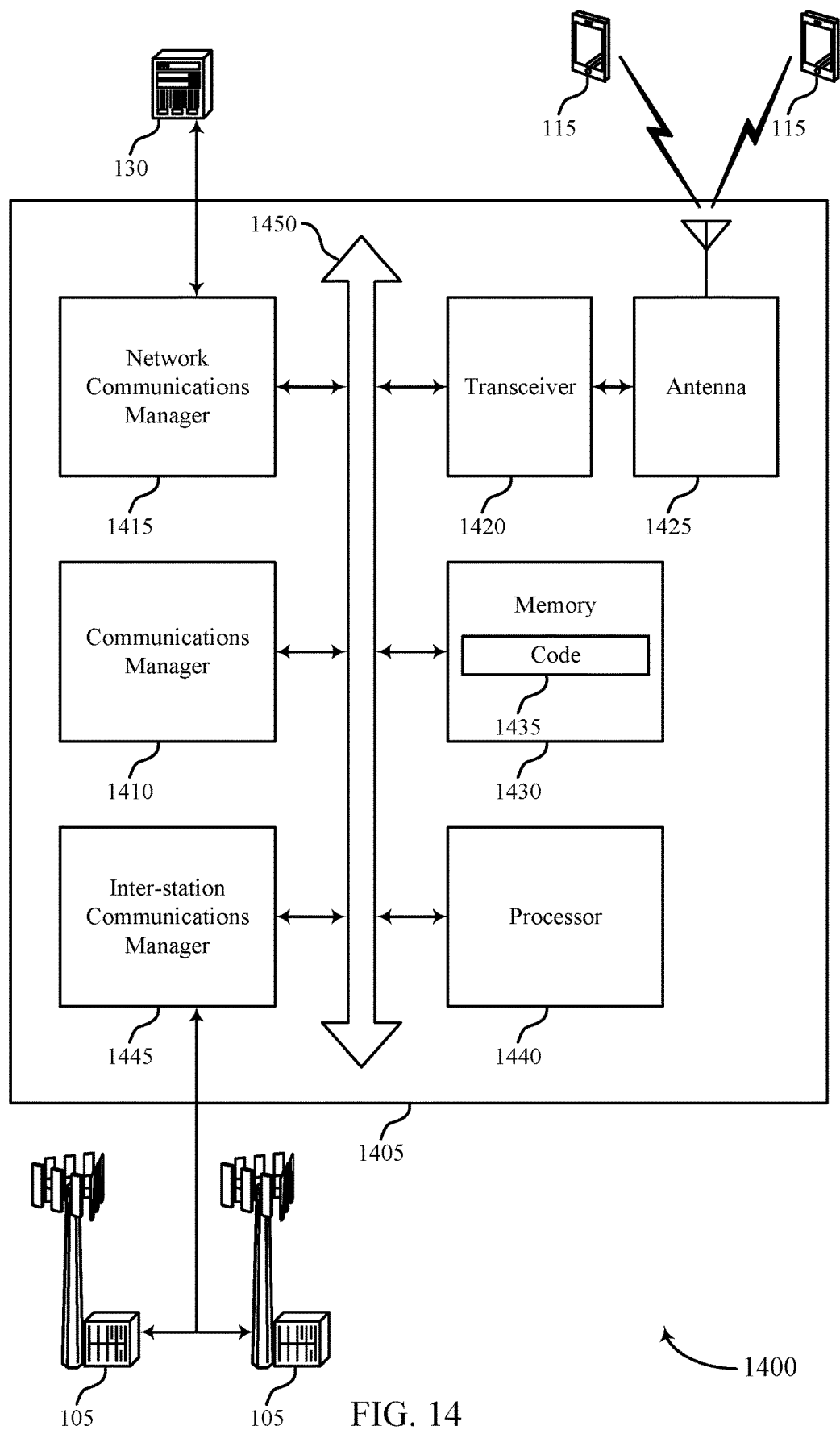
FIG. 14 shows a diagram of a system including a device that supports aperiodic and cross component carrier PRSs in accordance with aspects of the present disclosure.

FIG. 14 shows a diagram of a system 1400 including a device 1405 that supports aperiodic and cross component carrier PRSs in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a dynamic trigger that indicates that a UE is to monitor for a downlink PRS from a base station and receive a measurement report that indicates a timing measurement for the downlink PRS. The communications manager 1410 may also receive a capability indicator that indicates a UE is capable of maintaining phase coherence for a PRS that spans multiple component carriers, transmit control signaling indicating a set of component carriers on which the PRS is phase coherent based on the capability indicator, transmit the PRS that spans the set of component carriers based on the control signaling, and receive a measurement report that indicates a timing measurement for the PRS that spans the set of component carriers. The communications manager 1410 may also receive a capability indicator that indicates a UE is capable of maintaining phase coherence for a PRS that spans multiple component carriers, transmit control signaling indicating a set of component carriers on which the PRS by the UE is to be phase coherent based on the capability indicator, and generate a timing measurement for the PRS that spans the set of component carriers based on the control signaling.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting aperiodic and cross component carrier PRSs).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
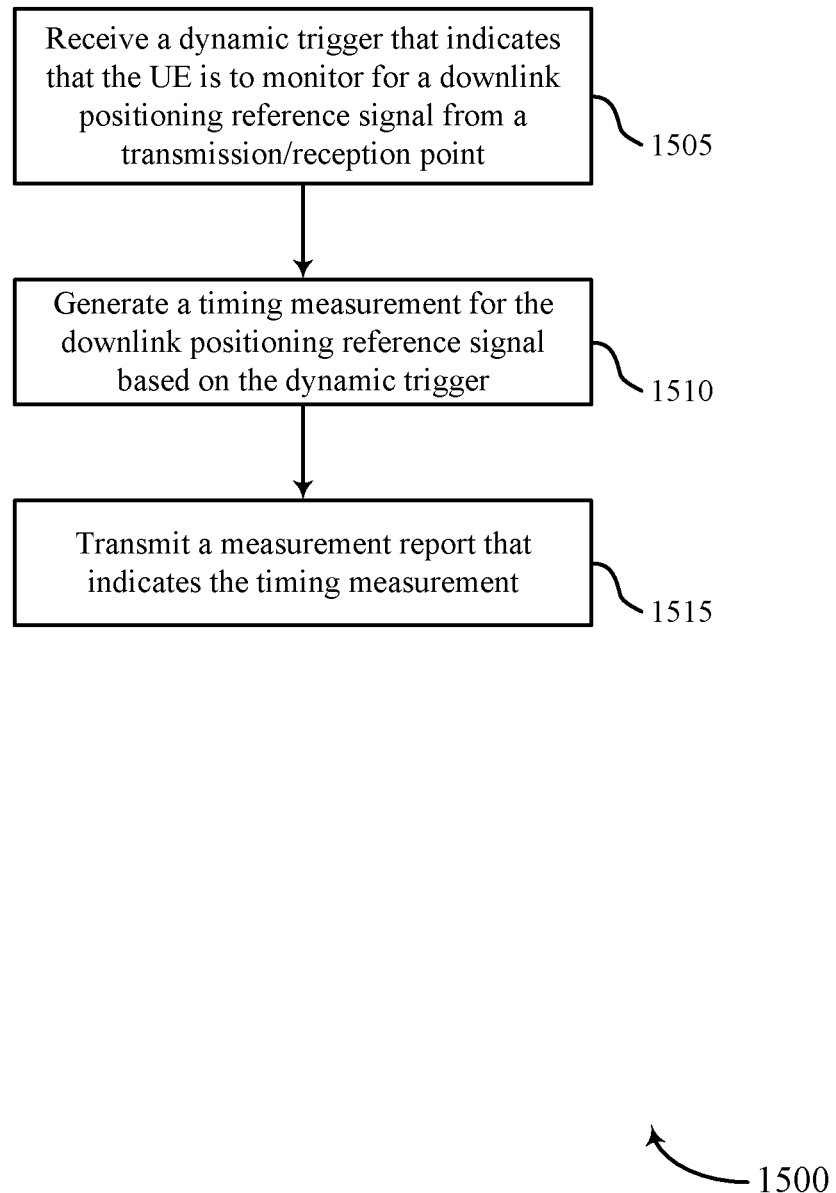
FIGS. 15 through 21 show flowcharts illustrating methods that support aperiodic and cross component carrier PRSs in accordance with aspects of the present disclosure.

FIG. 15 shows a flowchart illustrating a method 1500 that supports aperiodic and cross component carrier PRSs in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may receive a dynamic trigger that indicates that the UE is to monitor for a downlink PRS from a base station. The operations of 1505 may be performed according to the methods described herein. In some examples, aspects of the operations of 1505 may be performed by a trigger manager as described with reference to FIGS. 7 through 10.

At 1510, the UE may generate a timing measurement for the downlink PRS based on the dynamic trigger. The operations of 1510 may be performed according to the methods described herein. In some examples, aspects of the operations of 1510 may be performed by a measurement manager as described with reference to FIGS. 7 through 10.

At 1515, the UE may transmit a measurement report that indicates the timing measurement. The operations of 1515 may be performed according to the methods described herein. In some examples, aspects of the operations of 1515 may be performed by a reporting manager as described with reference to FIGS. 7 through 10.

Figure 16:
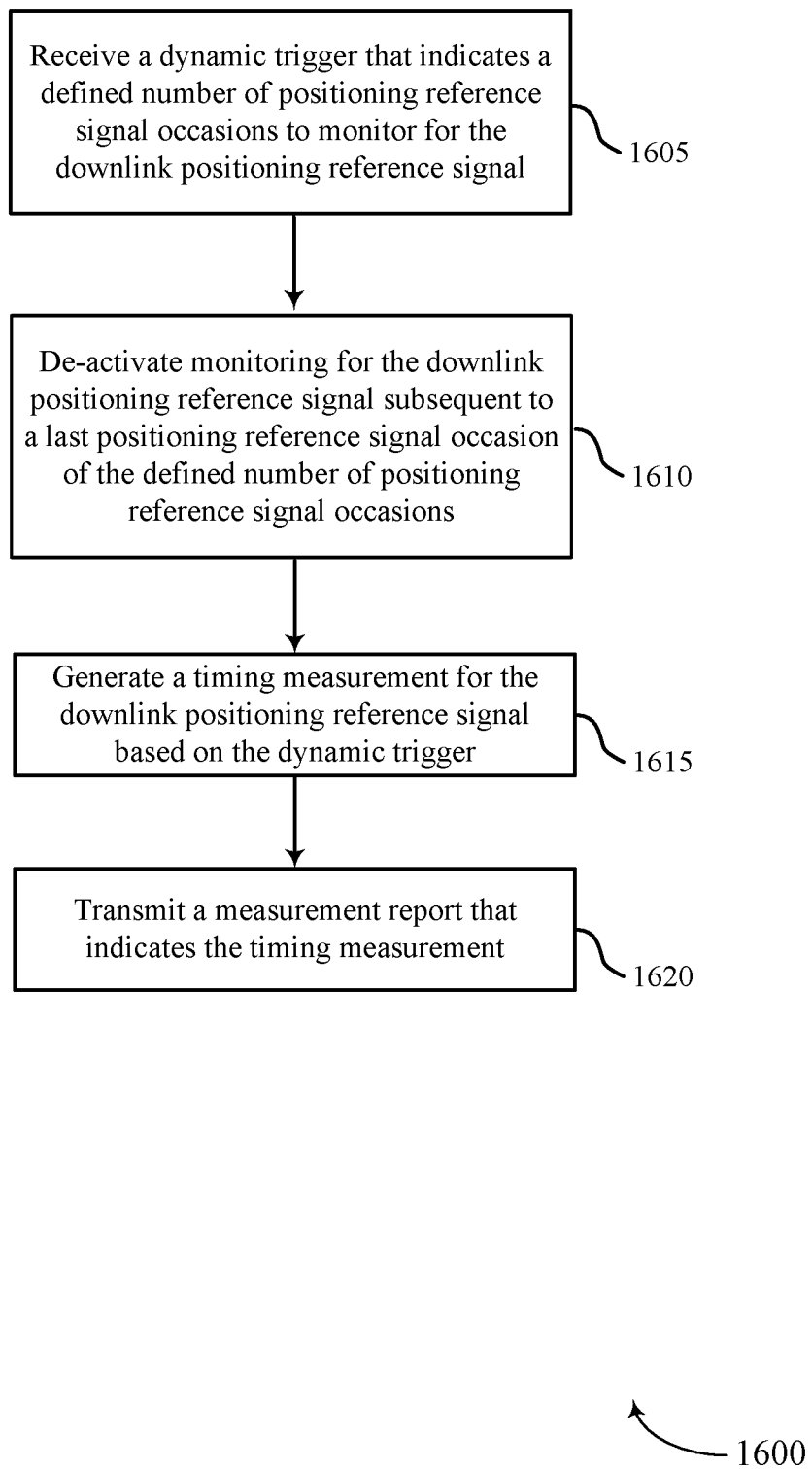

FIG. 16 shows a flowchart illustrating a method 1600 that supports aperiodic and cross component carrier PRSs in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may receive the dynamic trigger that indicates a defined number of PRS occasions to monitor for the downlink PRS. The operations of 1605 may be performed according to the methods described herein. In some examples, aspects of the operations of 1605 may be performed by a monitoring manager as described with reference to FIGS. 7 through 10.

At 1610, the UE may de-activate monitoring for the downlink PRS subsequent to a last PRS occasion of the defined number of PRS occasions. The operations of 1610 may be performed according to the methods described herein. In some examples, aspects of the operations of 1610 may be performed by a monitoring manager as described with reference to FIGS. 7 through 10.

At 1615, the UE may generate a timing measurement for the downlink PRS based on the dynamic trigger. The operations of 1615 may be performed according to the methods described herein. In some examples, aspects of the operations of 1615 may be performed by a measurement manager as described with reference to FIGS. 7 through 10.

At 1620, the UE may transmit a measurement report that indicates the timing measurement. The operations of 1620 may be performed according to the methods described herein. In some examples, aspects of the operations of 1620 may be performed by a reporting manager as described with reference to FIGS. 7 through 10.

Figure 17:
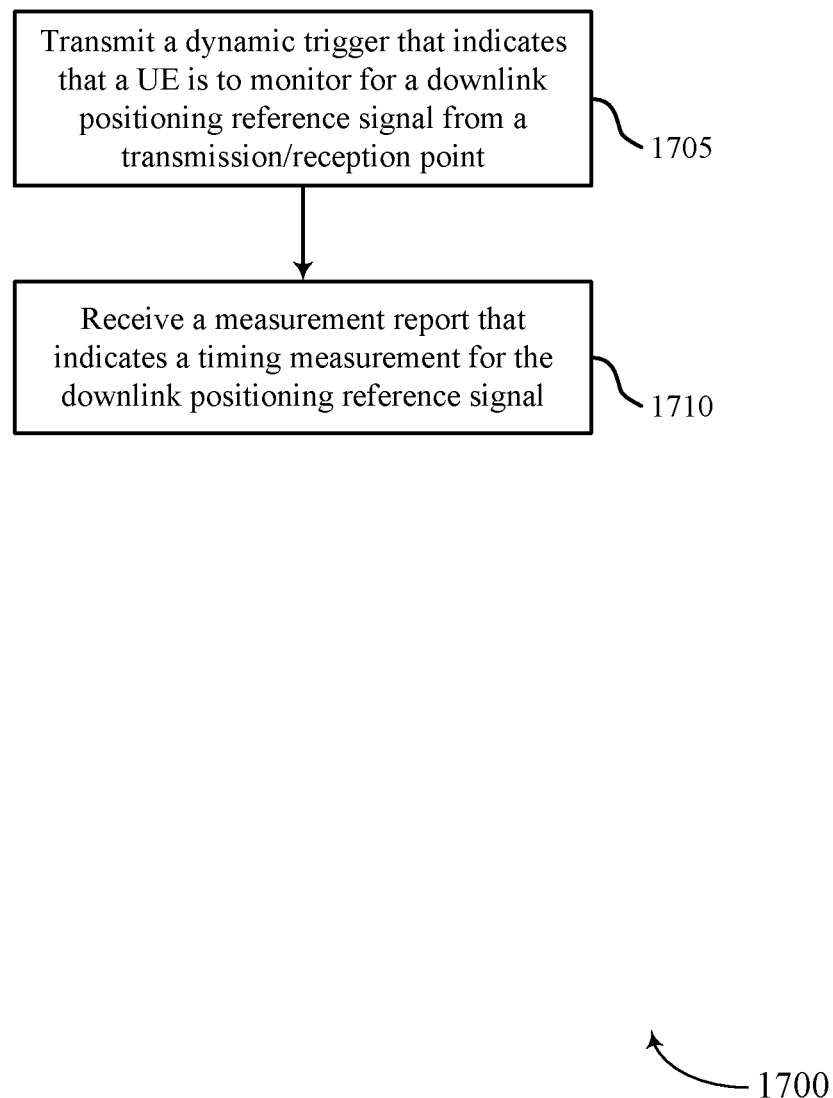

FIG. 17 shows a flowchart illustrating a method 1700 that supports aperiodic and cross component carrier PRSs in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1705, the base station may transmit a dynamic trigger that indicates that a UE is to monitor for a downlink PRS from a base station. The operations of 1705 may be performed according to the methods described herein. In some examples, aspects of the operations of 1705 may be performed by a trigger manager as described with reference to FIGS. 11 through 14.

At 1710, the base station may receive a measurement report that indicates a timing measurement for the downlink PRS. The operations of 1710 may be performed according to the methods described herein. In some examples, aspects of the operations of 1710 may be performed by a reporting manager as described with reference to FIGS. 11 through 14.

Figure 18:
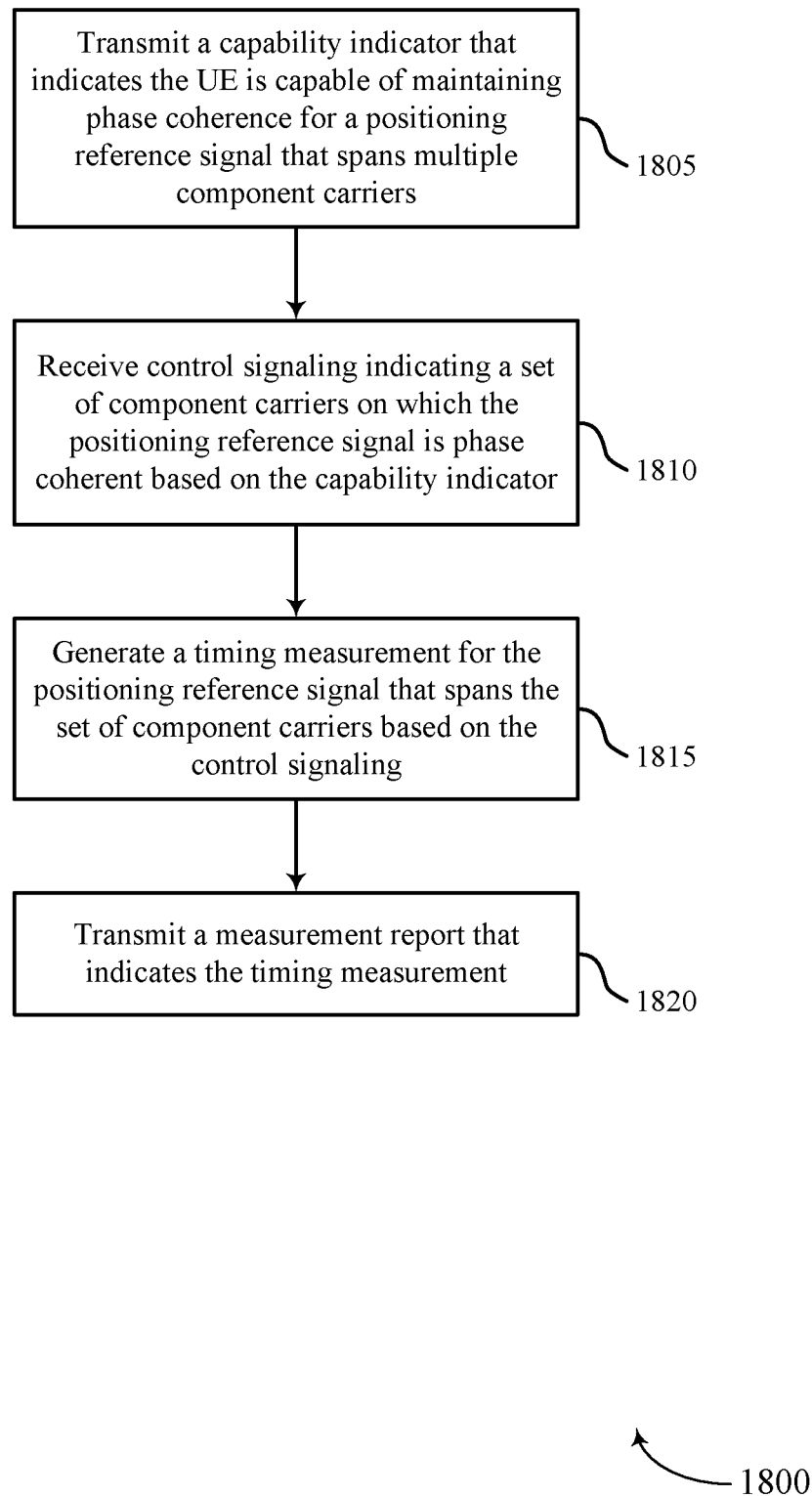

FIG. 18 shows a flowchart illustrating a method 1800 that supports aperiodic and cross component carrier PRSs in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1805, the UE may transmit a capability indicator that indicates the UE is capable of maintaining phase coherence for a PRS that spans multiple component carriers. The operations of 1805 may be performed according to the methods described herein. In some examples, aspects of the operations of 1805 may be performed by a capability indicator manager as described with reference to FIGS. 7 through 10.

At 1810, the UE may receive control signaling indicating a set of component carriers on which the PRS is phase coherent based on the capability indicator. The operations of 1810 may be performed according to the methods described herein. In some examples, aspects of the operations of 1810 may be performed by a control signaling manager as described with reference to FIGS. 7 through 10.

At 1815, the UE may generate a timing measurement for the PRS that spans the set of component carriers based on the control signaling. The operations of 1815 may be performed according to the methods described herein. In some examples, aspects of the operations of 1815 may be performed by a timing measurement manager as described with reference to FIGS. 7 through 10.

At 1820, the UE may transmit a measurement report that indicates the timing measurement. The operations of 1820 may be performed according to the methods described herein. In some examples, aspects of the operations of 1820 may be performed by a measurement reporting manager as described with reference to FIGS. 7 through 10.

Figure 19:
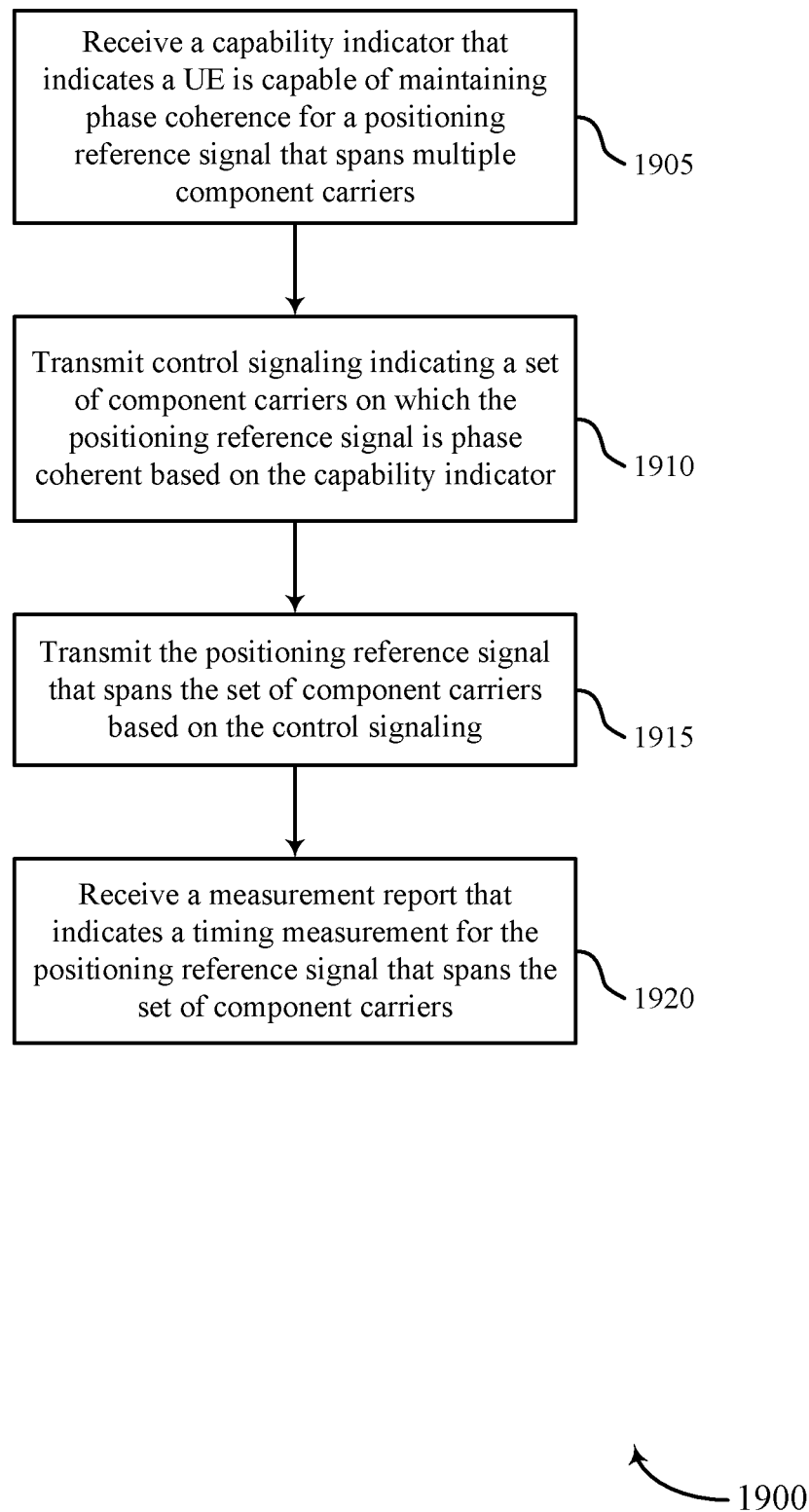

FIG. 19 shows a flowchart illustrating a method 1900 that supports aperiodic and cross component carrier PRSs in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1905, the base station may receive a capability indicator that indicates a UE is capable of maintaining phase coherence for a PRS that spans multiple component carriers. The operations of 1905 may be performed according to the methods described herein. In some examples, aspects of the operations of 1905 may be performed by a capability indicator manager as described with reference to FIGS. 11 through 14.

At 1910, the base station may transmit control signaling indicating a set of component carriers on which the PRS is phase coherent based on the capability indicator. The operations of 1910 may be performed according to the methods described herein. In some examples, aspects of the operations of 1910 may be performed by a control signaling manager as described with reference to FIGS. 11 through 14.

At 1915, the base station may transmit the PRS that spans the set of component carriers based on the control signaling. The operations of 1915 may be performed according to the methods described herein. In some examples, aspects of the operations of 1915 may be performed by a PRS manager as described with reference to FIGS. 11 through 14.

At 1920, the base station may receive a measurement report that indicates a timing measurement for the PRS that spans the set of component carriers. The operations of 1920 may be performed according to the methods described herein. In some examples, aspects of the operations of 1920 may be performed by a measurement reporting manager as described with reference to FIGS. 11 through 14.

Figure 20:
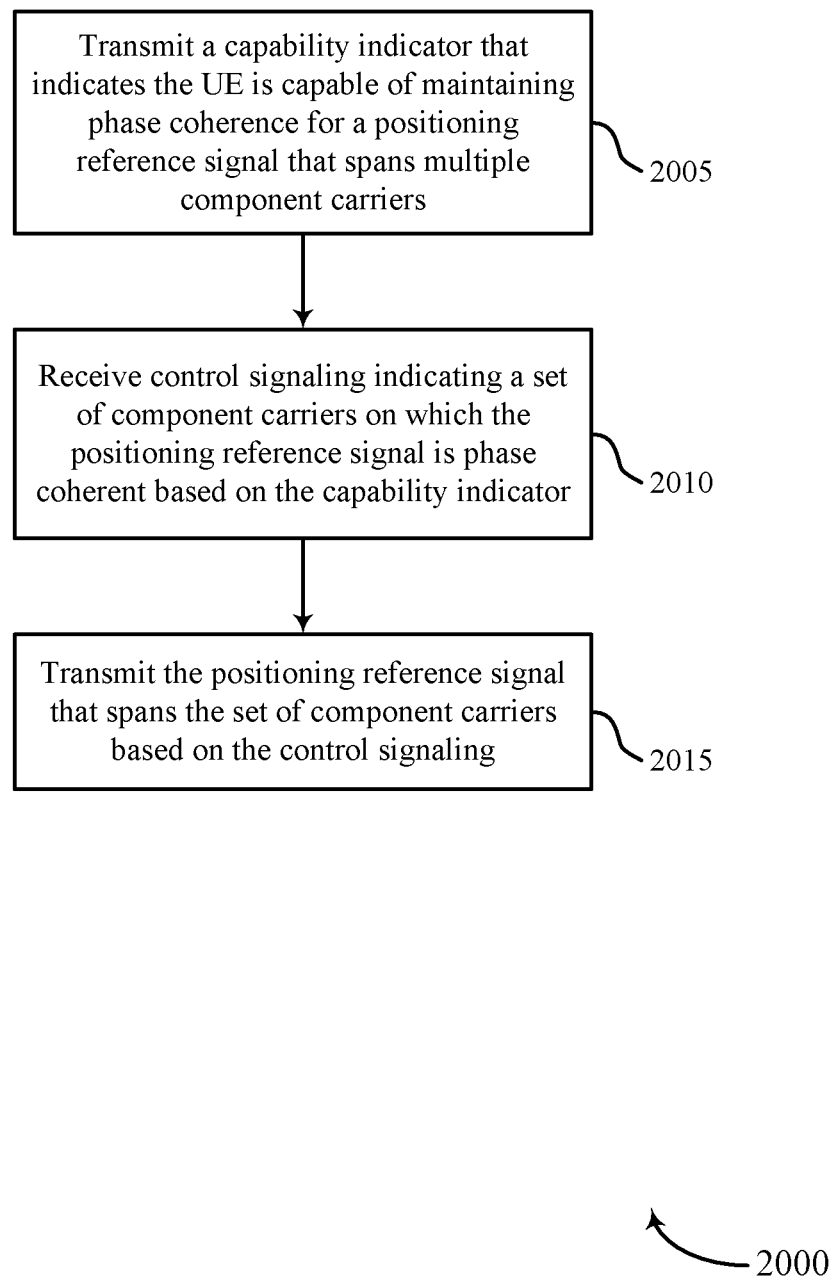

FIG. 20 shows a flowchart illustrating a method 2000 that supports aperiodic and cross component carrier PRSs in accordance with aspects of the present disclosure. The operations of method 2000 may be implemented by a UE 115 or its components as described herein. For example, the operations of method 2000 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 2005, the UE may transmit a capability indicator that indicates the UE is capable of maintaining phase coherence for a PRS that spans multiple component carriers. The operations of 2005 may be performed according to the methods described herein. In some examples, aspects of the operations of 2005 may be performed by a capability indicator manager as described with reference to FIGS. 7 through 10.

At 2010, the UE may receive control signaling indicating a set of component carriers on which the PRS is phase coherent based on the capability indicator. The operations of 2010 may be performed according to the methods described herein. In some examples, aspects of the operations of 2010 may be performed by a control signaling manager as described with reference to FIGS. 7 through 10.

At 2015, the UE may transmit the PRS that spans the set of component carriers based on the control signaling. The operations of 2015 may be performed according to the methods described herein. In some examples, aspects of the operations of 2015 may be performed by a PRS manager as described with reference to FIGS. 7 through 10.

Figure 21:
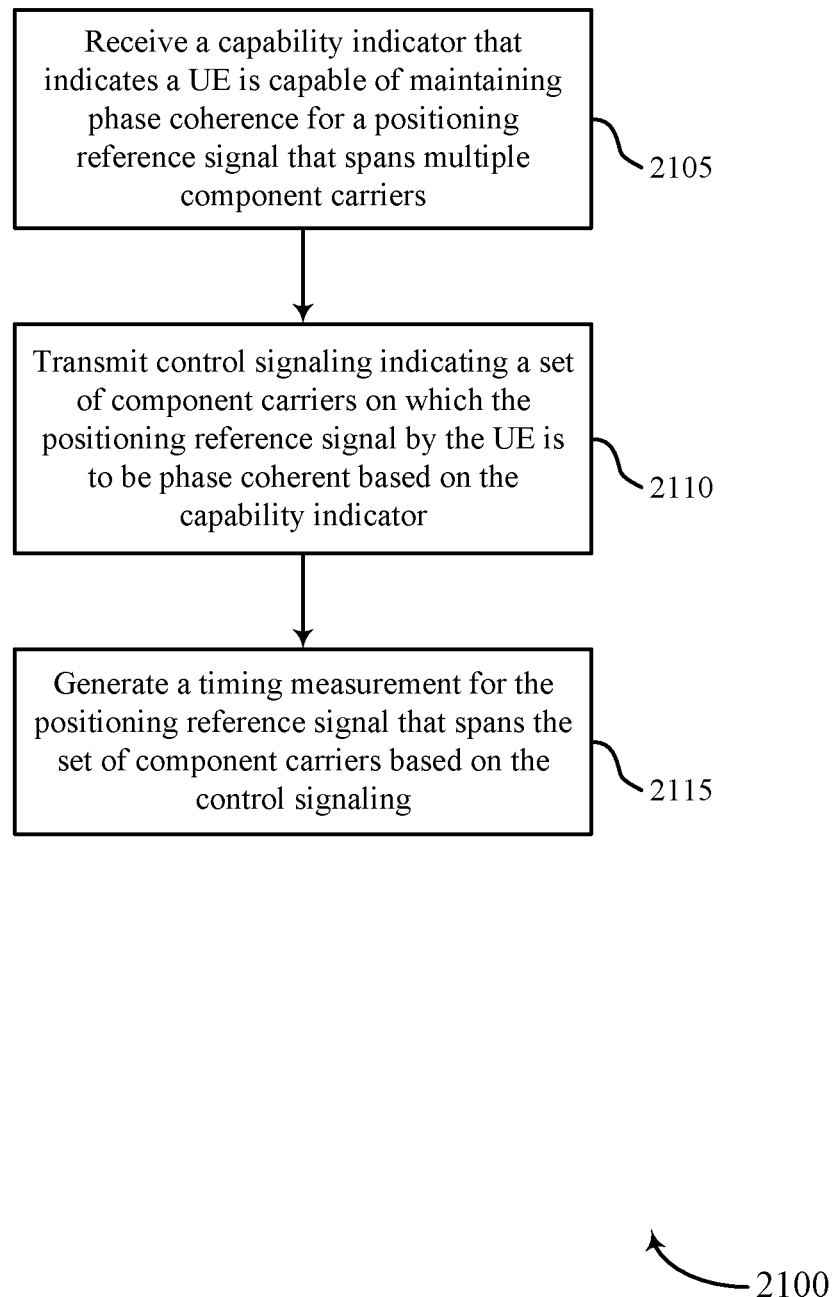

FIG. 21 shows a flowchart illustrating a method 2100 that supports aperiodic and cross component carrier PRSs in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2105, the base station may receive a capability indicator that indicates a UE is capable of maintaining phase coherence for a PRS that spans multiple component carriers. The operations of 2105 may be performed according to the methods described herein. In some examples, aspects of the operations of 2105 may be performed by a capability indicator manager as described with reference to FIGS. 11 through 14.

At 2110, the base station may transmit control signaling indicating a set of component carriers on which the PRS by the UE is to be phase coherent based on the capability indicator. The operations of 2110 may be performed according to the methods described herein. In some examples, aspects of the operations of 2110 may be performed by a control signaling manager as described with reference to FIGS. 11 through 14.

At 2115, the base station may generate a timing measurement for the PRS that spans the set of component carriers based on the control signaling. The operations of 2115 may be performed according to the methods described herein. In some examples, aspects of the operations of 2115 may be performed by a timing measurement manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications by a user equipment (UE), comprising:
    one or more transceivers;
    one or more memory; and
    one or more processors electronically coupled to the one or more memory and the one or more transceivers, the one or more processors configured to:
    receive a dynamic trigger that is a medium access control (MAC) control element (CE), downlink control information, or both, the dynamic trigger indicating that the UE is to monitor for a downlink positioning reference signal from a transmission/reception point;
    generate a timing measurement for the downlink positioning reference signal based at least in part on the dynamic trigger; and
    transmit a measurement report that indicates the timing measurement.

2. The apparatus of claim 1, wherein the processor is configured to:
    receive the dynamic trigger that indicates to monitor for a respective downlink positioning reference signal from each transmission/reception point of a plurality of transmission/reception points.

3. The apparatus of claim 2, wherein the processor is configured to:
    generate a respective timing measurement for the respective downlink positioning reference signals, wherein the measurement report indicates at least one of the respective timing measurements.

4. The apparatus of claim 1, wherein the processor is configured to:
    receive the dynamic trigger that indicates a positioning reference signal occasion to monitor for the downlink positioning reference signal.

5. The apparatus of claim 4, wherein the processor is configured to:
    receive the dynamic trigger that indicates that a duration of the positioning reference signal occasion is at least one transmission time interval.

6. The apparatus of claim 5, wherein each transmission time interval of the at least one transmission time interval is a symbol period, a mini-slot, or a slot.

7. The apparatus of claim 1, wherein the processor is configured to:
    receive the dynamic trigger that indicates a defined number of positioning reference signal occasions to monitor for the downlink positioning reference signal.

8. The apparatus of claim 7, wherein the processor is configured to:
    de-activate monitoring for the downlink positioning reference signal subsequent to a last positioning reference signal occasion of the defined number of positioning reference signal occasions.

9. The apparatus of claim 1, wherein the processor is configured to:
    transmit a trigger request to the transmission/reception point, wherein the dynamic trigger is received based at least in part on the trigger request.

10. The apparatus of claim 1, wherein the processor is configured to:
    receive the dynamic trigger that indicates a muting pattern; and
    determine to monitor for the downlink positioning reference signal during a downlink positioning reference signal occasion based at least in part on the muting pattern.

11. The apparatus of claim 1, wherein the processor is configured to:
    receive the dynamic trigger that indicates a muting pattern; and
    determine to skip monitoring for the downlink positioning reference signal during a downlink positioning reference signal occasion based at least in part on the muting pattern.

12. An apparatus for wireless communications by a transmission/reception point, comprising:
    one or more transceivers;
    one or more memory; and
    one or more processors electronically coupled to the one or more memory and the one or more transceivers, the one or more processors configured to:
    transmit a dynamic trigger that is a medium access control (MAC) control element (CE), downlink control information, or both, the dynamic trigger indicating that a user equipment (UE) is to monitor for a downlink positioning reference signal from a transmission/reception point; and receive a measurement report that indicates a timing measurement for the downlink positioning reference signal.

13. The apparatus of claim 12, wherein the processor is configured to:

transmit a downlink positioning reference signal configuration to a second transmission/reception point to coordinate transmission of the downlink positioning reference signal with transmission of a second downlink positioning reference signal by the second transmission/reception point.

14. The apparatus of claim 12, wherein the processor is configured to:

transmit the dynamic trigger that indicates to monitor for a respective downlink positioning reference signal from each transmission/reception point of a plurality of transmission/reception points.

15. The apparatus of claim 12, wherein the processor is configured to:

transmit the dynamic trigger that indicates a positioning reference signal occasion to monitor for the downlink positioning reference signal.

16. The apparatus of claim 12, wherein the processor is configured to:

transmit the dynamic trigger that indicates a defined number of positioning reference signal occasions to monitor for the downlink positioning reference signal.

17. The apparatus of claim 12, wherein the processor is configured to:

receive a trigger request from the UE, wherein the dynamic trigger is transmitted based at least in part on the trigger request.

* * * * *